(12) United States Patent
Mori

(10) Patent No.: US 9,933,598 B2
(45) Date of Patent: Apr. 3, 2018

(54) IMAGING LENS AND IMAGING APPARATUS

(71) Applicant: FUJIFILM Corporation, Tokyo (JP)

(72) Inventor: Masao Mori, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/442,771

(22) Filed: Feb. 27, 2017

(65) Prior Publication Data
US 2017/0269327 A1    Sep. 21, 2017

(51) Int. Cl.
| G02B 9/00 | (2006.01) |
| G02B 9/64 | (2006.01) |
| G02B 9/62 | (2006.01) |
| G02B 13/00 | (2006.01) |
| G02B 13/06 | (2006.01) |

(52) U.S. Cl.
CPC .............. *G02B 9/64* (2013.01); *G02B 9/62* (2013.01); *G02B 13/0045* (2013.01); *G02B 13/06* (2013.01)

(58) Field of Classification Search
CPC ....................................................... G02B 9/64
USPC .......................................................... 359/754
See application file for complete search history.

(56) References Cited

U.S. PATENT DOCUMENTS

| 2015/0268446 A1 | 9/2015 | Chen et al. | |
| 2016/0252709 A1* | 9/2016 | Lin | G02B 13/0045 348/335 |

* cited by examiner

*Primary Examiner* — James Jones
(74) *Attorney, Agent, or Firm* — Studebaker & Brackett PC

(57) ABSTRACT

An imaging lens includes, in order from the object side to the image side: a first lens having a negative refractive power and a concave surface toward the image side; a positive second lens having a negative refractive power; a third lens having a positive refractive power and a convex surface toward the image side; a fourth lens having a convex surface toward the image side; a fifth lens having a positive refractive power and a convex surface toward the image side; and a sixth lens having a negative refractive power and a concave surface toward the object side. Predetermined conditional formulae related to first lens, the second lens, and the third lens are satisfied.

20 Claims, 21 Drawing Sheets

EXAMPLE 1

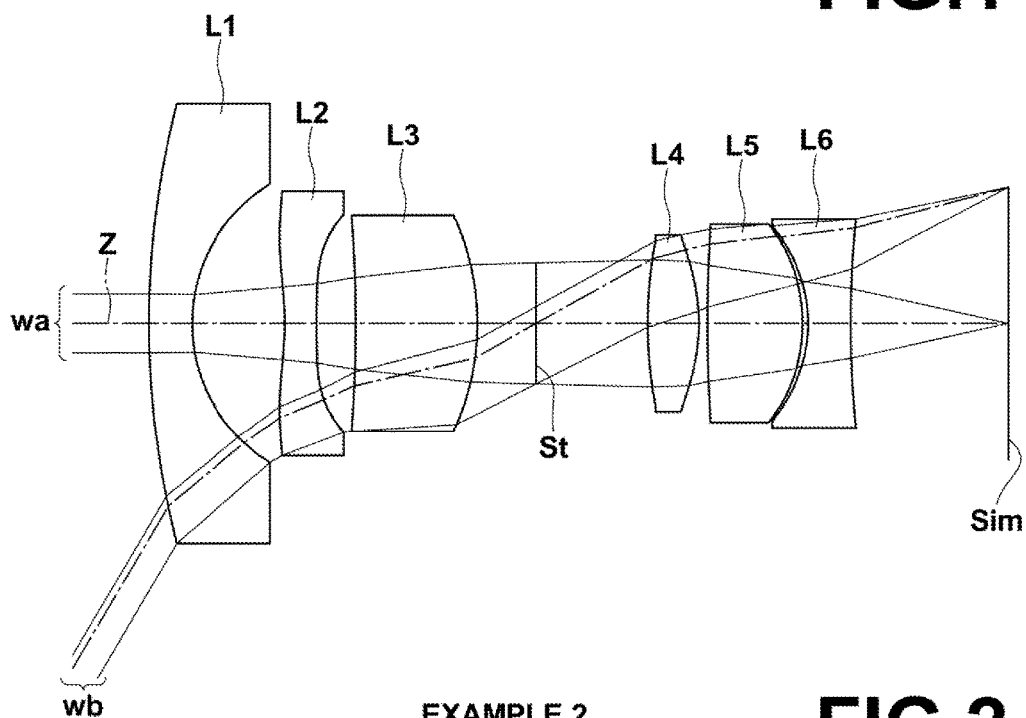
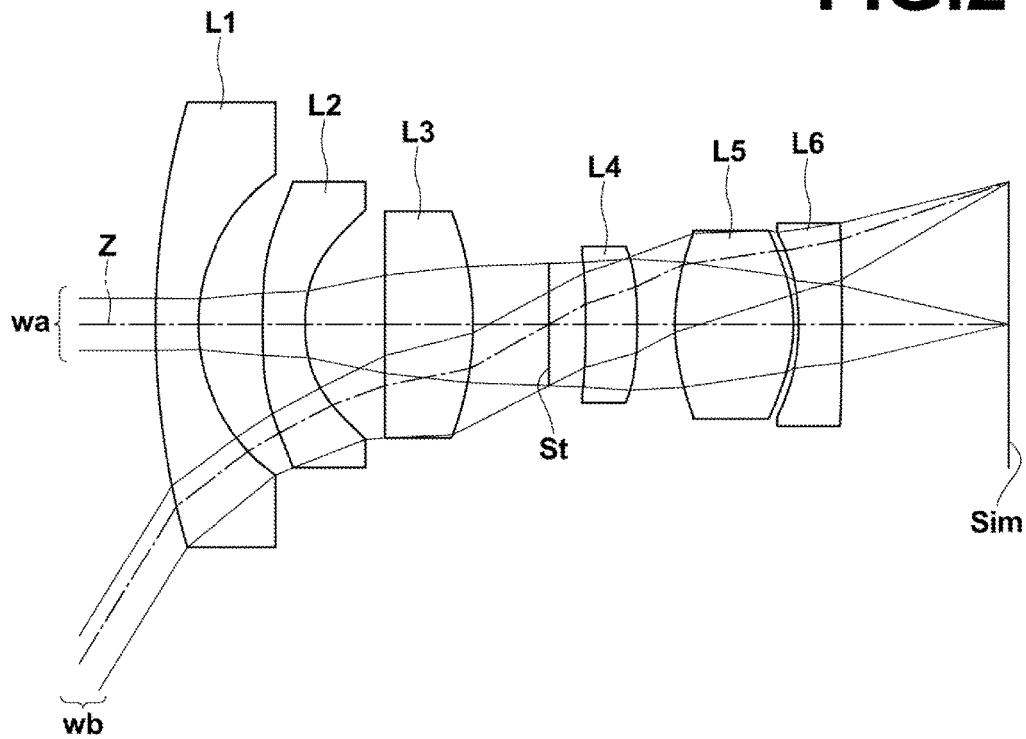

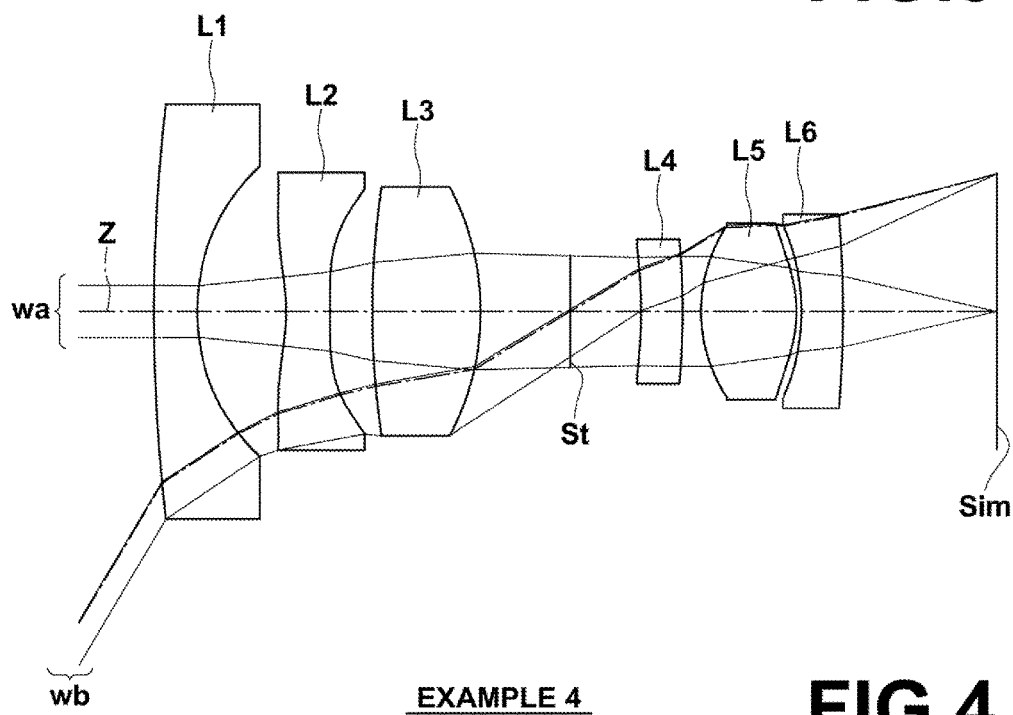
FIG.3 EXAMPLE 3
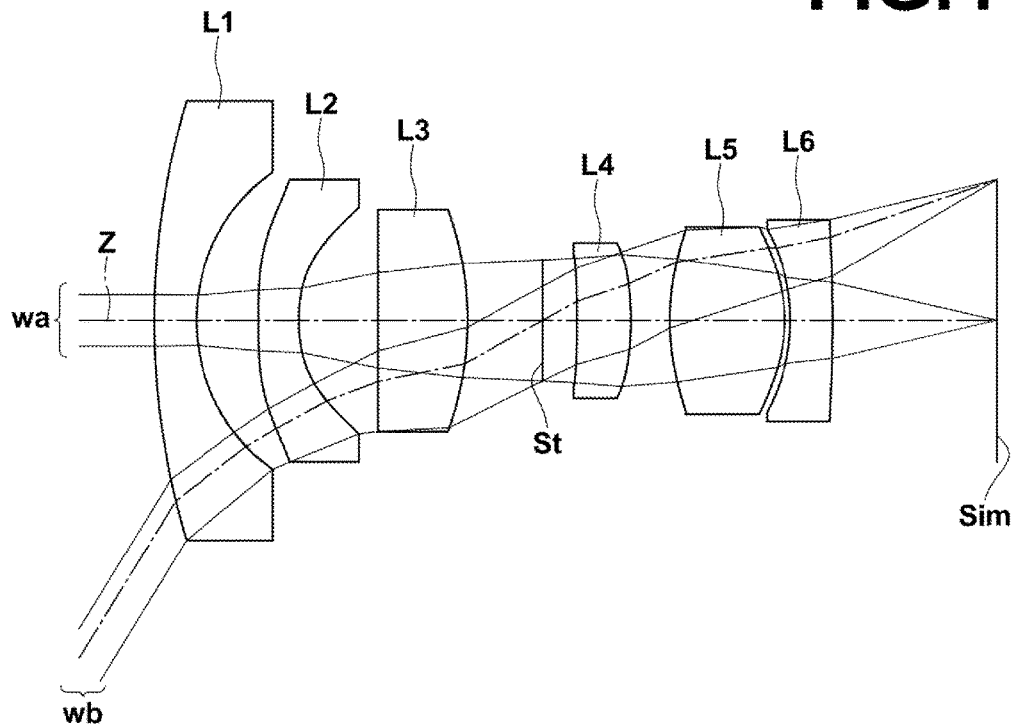
FIG.4 EXAMPLE 4

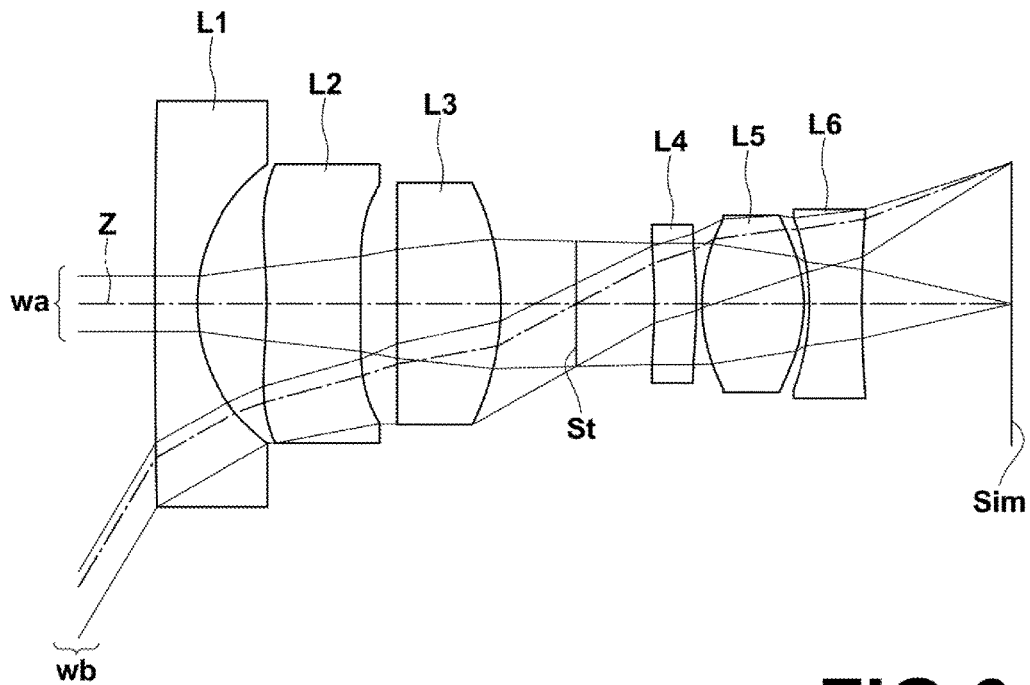
EXAMPLE 5 FIG.5
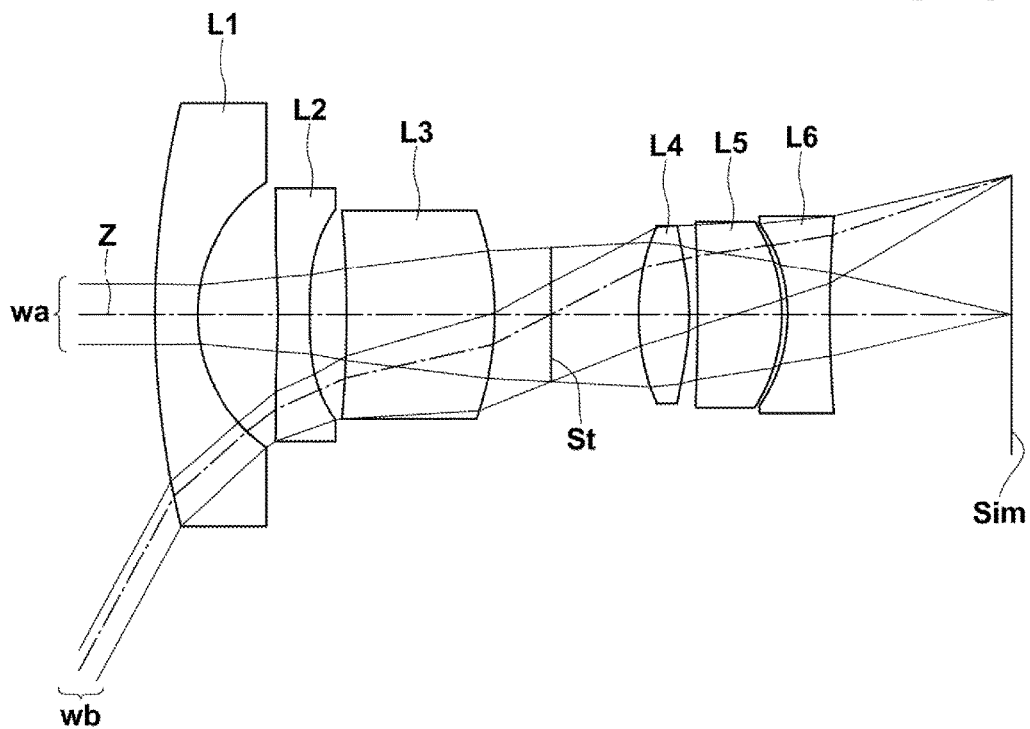
EXAMPLE 6 FIG.6

EXAMPLE 7

EXAMPLE 8

FIG.9 EXAMPLE 1

FIG.12 EXAMPLE 4

IMAGING LENS AND IMAGING APPARATUS

CROSS REFERENCE TO RELATED APPLICATIONS

The present application claims priority under 35 U.S.C. § 119 to Japanese Patent Application No. 2016-055495 filed on Mar. 18, 2016. The above application is hereby expressly incorporated by reference, in its entirety, into the present application.

BACKGROUND

The present disclosure is related to an imaging lens which is particularly suited for use in a sensing camera, and to an imaging apparatus equipped with this imaging lens.

Recently, cameras are being mounted on automobiles to assist drivers in confirming blind spots toward the sides and the rear, and to perform image recognition for automobiles, pedestrians, and/or obstacles in the vicinity of the automobiles. A known imaging lens which is utilizable in such sensing cameras is disclosed in US Patent Application Publication No. 20150268446. US Patent Application Publication No. 20150268446 discloses a lens system having a six lens configuration.

SUMMARY

Generally, it is desired for sensing cameras to be able to image a range equal to or greater than the field of vision of humans. Therefore a certain degree of wide angle performance is in demand.

The imaging lens disclosed in US Patent Application Publication No. 20150268446 achieves a wide angle performance of 100° or greater. However, the incident angles of principal light rays into an image formation plane are great. Such a configuration will prevent efficient accumulation of light at the peripheral portions of an imaging element, which is disadvantageous from the viewpoint of increasing resolution, compared to those having smaller incident angles. In addition, such a configuration is also disadvantageous in cases that imaging elements having large image capturing areas are utilized in order to increase resolution.

The present disclosure has been developed in view of the foregoing circumstances. The present disclosure provides a high performance imaging lens having a wide angle of view, which is capable of high resolution imaging, as well as an imaging apparatus equipped with this imaging lens.

An imaging lens of the present disclosure consists of, in order from the object side to the image side:

a first lens having a negative refractive power and a concave surface toward the image side;

a second lens having a negative refractive power;

a third lens having a positive refractive power and a convex surface toward the image side;

a fourth lens having a convex surface toward the image side;

a fifth lens having a positive refractive power and a convex surface toward the image side; and a sixth lens having a negative refractive power and a concave surface toward the object side; and Conditional Formulae (1) and (2) below are satisfied:

$$0.15 < f1/f2 < 1.3 \quad (1)$$

$$1.8 < f3/f < 4.5 \quad (2)$$

wherein f1 is the focal length of the first lens, f2 is the focal length of the second lens, f3 is the focal length of the third lens, and f is the focal length of the entire lens system.

Note that it is preferable for Conditional Formula (1-1) below and/or Conditional Formula (2-1) below to be satisfied.

$$0.15 < f1/f2 < 1.1 \quad (1-1)$$

$$2 < f3/f < 4 \quad (2-1)$$

In the imaging lens of the present disclosure, it is preferable for the surface toward the image side of the second lens to be concave.

In addition, it is preferable for the surface toward the image side of the second lens to be of a shape in which a line normal to the surface at an arbitrary point at 30% or greater of the image height of the surface intersects with the optical axis toward the image side of the surface. Here, the expression "an arbitrary point at 30% or greater of the image height of the surface (the surface toward the image side of the second lens)" means an arbitrary point at 30% or higher on the surface, with a height from the optical axis to an intersecting point between a principal light ray at a maximum angle of view and this surface designated as 100%

In addition, it is preferable for Conditional Formula (3) below to be satisfied, and more preferable for Conditional Formula (3-1) below to be satisfied.

$$-1.9 < f12/f < -0.8 \quad (3)$$

$$-1.6 < f12/f < -0.9 \quad (3-1)$$

wherein f12 is the combined focal length of the first lens and the second lens, and f is the focal length of entire lens system.

In addition, it is preferable for Conditional Formula (4) below to be satisfied, and more preferable for Conditional Formula (4-1) below to be satisfied.

$$-10 < f2/f < -2 \quad (4)$$

$$-8.5 < f2/f < -2.5 \quad (4-1)$$

wherein f2 is the focal length of the second lens, and f is the focal length of the entire lens system.

In addition, it is preferable for Conditional Formula (5) below to be satisfied, and more preferable for Conditional Formula (5-1) below and/or Conditional Formula (5-2) below to be satisfied.

$$-18 < r6/f < -1.7 \quad (5)$$

$$-15.5 < r6/f < -1.9 \quad (5-1)$$

$$-3 < r6/f < -1.9 \quad (5-2)$$

wherein r6 is the radius of curvature of the surface toward the image side of the third lens, and f is the focal length of the entire lens system.

In addition, it is preferable for Conditional Formula (6) below to be satisfied, and more preferable for Conditional Formula (6-1) below to be satisfied.

$$0.9 < f5/f < 3 \quad (6)$$

$$1.1 < f5/f < 2.5 \quad (6-1)$$

wherein f5 is the focal length of the fifth lens, and f is the focal length of the entire lens system.

In addition, it is preferable for Conditional Formula (7) below to be satisfied, and more preferable for Conditional Formula (7-1) below to be satisfied.

$$-3 < f6/f < -1 \qquad (7)$$

$$-2.5 < f6/f < -1.2 \qquad (7\text{-}1)$$

wherein f6 is the focal length of the sixth lens, and f is the focal length of the entire lens system.

In addition, it is preferable for Conditional Formula (8) below to be satisfied.

$$L56/f < 0.6 \qquad (8)$$

wherein L56 is the distance along the optical axis between the fifth lens and the sixth lens, and f is the focal length of the entire lens system.

In addition, it is preferable for Conditional Formula (9) below to be satisfied.

$$0.6 < \max|f/fx| < 0.85 \qquad (9)$$

wherein fx is the focal length of an xth lens (x=1~6), and f is the focal length of the entire lens system.

In addition, it is preferable for the combined refractive power of the fourth lens and the fifth lens to be positive, and for a stop to be positioned between the third lens and the fourth lens.

In addition, it is preferable for Conditional Formulae (10) and (11) below to be satisfied, and more preferable for Conditional Formula (10-1) below and/or Conditional Formula (11-1) below to be satisfied.

$$55 < v5 \qquad (10)$$

$$60 < v5 \qquad (10\text{-}1)$$

$$v6 < 30 \qquad (11)$$

$$v6 < 25 \qquad (11\text{-}1)$$

wherein v5 is the Abbe's number of the fifth lens, and v6 is the Abbe's number of the sixth lens.

An imaging apparatus of the present disclosure is equipped with the imaging lens of the present disclosure.

Note that the above expression "consists of" means that lenses that practically have no power, optical elements other than lenses such as a stop, a mask, a cover glass, and filters, and mechanical components such as lens flanges, a lens barrel, an imaging element, a camera shake correcting mechanism, etc. may be included, in addition to the constituent elements listed above.

Note that the surface shapes, the radii of curvature, and/or the signs of the refractive powers of lenses in the above lens are those which are considered in the paraxial region for lenses that include aspherical surfaces. In addition, all of the above conditional formulae are related to values using the d line (wavelength: 587.6 nm) as a standard, unless noted otherwise.

The imaging lens of the present disclosure consists of, in order from the object side to the image side: the first lens having a negative refractive power and a concave surface toward the image side; the second lens having a negative refractive power; the third lens having a positive refractive power and a convex surface toward the image side; the fourth lens having a convex surface toward the image side; the fifth lens having a positive refractive power and a convex surface toward the image side; and the sixth lens having a negative refractive power and a concave surface toward the object side; and Conditional Formulae (1) and (2) below are satisfied. Therefore, a high performance imaging lens having a wide angle of view, which is capable of high resolution imaging, can be realized.

$$0.15 < f1/f2 < 1.3 \qquad (1)$$

$$1.8 < f3/f < 4.5 \qquad (2)$$

In addition, the imaging apparatus of the present disclosure is equipped with the imaging lens of the present disclosure. Therefore, wide angle images having high image quality can be obtained.

BRIEF DESCRIPTION OF THE DRAWINGS

FIG. 1 is a cross sectional diagram that illustrates the lens configuration of an imaging lens according to an embodiment of the present disclosure (which is common with that of Example 1).

FIG. 2 is a cross sectional diagram that illustrates the lens configuration of an imaging lens according to Example 2 of the present disclosure.

FIG. 3 is a cross sectional diagram that illustrates the lens configuration of an imaging lens according to Example 3 of the present disclosure.

FIG. 4 is a cross sectional diagram that illustrates the lens configuration of an imaging lens according to Example 4 of the present disclosure.

FIG. 5 is a cross sectional diagram that illustrates the lens configuration of an imaging lens according to Example 5 of the present disclosure.

FIG. 6 is a cross sectional diagram that illustrates the lens configuration of an imaging lens according to Example 6 of the present disclosure.

DETAILED DESCRIPTION OF THE PREFERRED EMBODIMENTS

Figure 7:
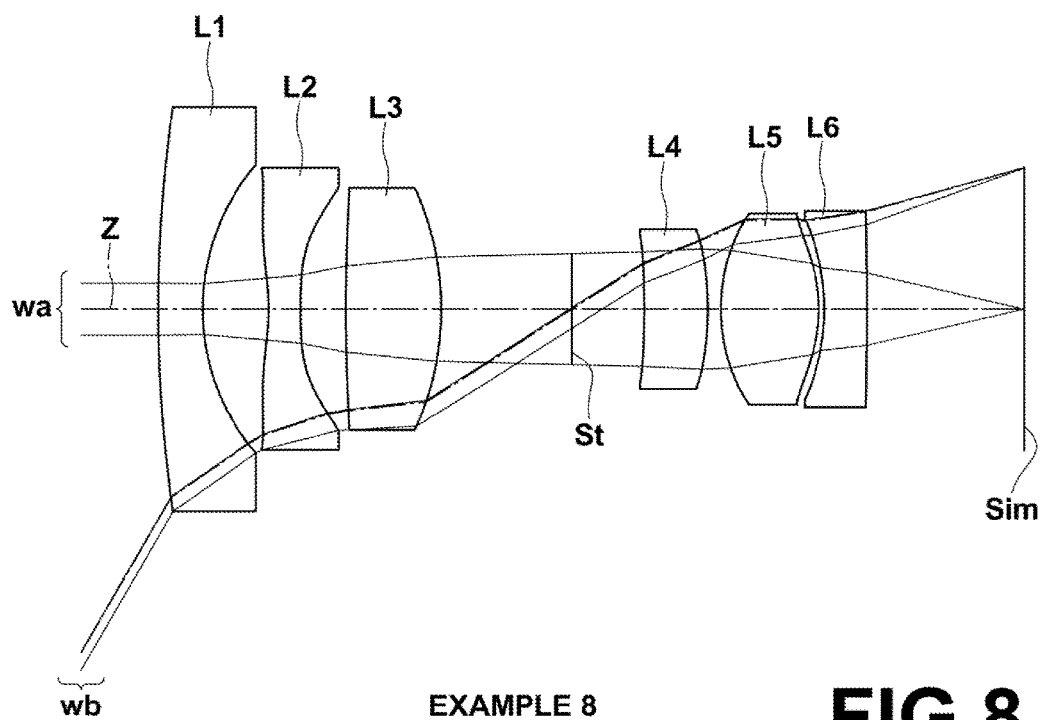
FIG. 7 is a cross sectional diagram that illustrates the lens configuration of an imaging lens according to Example 7 of the present disclosure.

Hereinafter, embodiments of the present disclosure will be described in detail with reference to the attached drawings. FIG. 1 is a cross sectional diagram that illustrates the lens configuration of an imaging lens according to an embodiment of the present disclosure. The example of the configuration illustrated in FIG. 1 corresponds to the configuration of an imaging lens of Example 1 to be described later. In FIG. 1, the left side is the object side, and the right side is the image side. The aperture stop St illustrated in FIG. 1 does not necessarily represent the size and/or the shape thereof, but the position thereof along an optical axis Z. In addition, FIG. 1 also illustrates the optical paths of an axial light beam wa and a light beam wb at a maximum angle of view.

As illustrated in FIG. 1, the imaging lens 1 is constituted by six lenses, which are, in order from the object side to the image side, a first lens L1 having a negative refractive power and a concave surface toward the image side; a second lens L2 having a negative refractive power; a third lens L3 having a positive refractive power and a convex surface toward the image side; a fourth lens L4 having a convex surface toward the image side; a fifth lens L5 having a positive refractive power and a convex surface toward the image side; and a sixth lens L6 having a negative refractive power and a concave surface toward the object side.

The generation of higher order aberration can be suppressed while widening the angle of view, and further, the generation of large amounts of distortion can also be suppressed, by the first lens L1 being a negative lens having a concave surface toward the image side, the second lens L2 being a negative lens, and the third lens L3 being a positive lens having a convex surface toward the image side. In addition, spherical aberration which is generated at the first lens L1 and the second lens L2 can be corrected, while light beams can be separated at the fourth lens L4 and the lenses subsequent thereto such that they function to correct aberrations, by the surface toward the image side of the third lens L3 being convex. As a result, efficient correction of aberrations at the rearward groups becomes possible.

Light beams at the peripheral portions can be prevented from being refracted in directions away from the optical axis, by the surface toward the image side of the fourth lens L4 being convex. Therefore, the incident angle of the peripheral light beams into an image formation plane Sim can be decreased. In addition, chromatic aberrations and comatic aberration can be favorably corrected, by positioning the fifth lens L5 having a positive refractive power and a convex surface toward the image side and the sixth lens L6 having a negative refractive power and a concave surface toward the object side adjacent to each other.

In addition, this imaging lens is configured such that Conditional Formulae (1) and (2) below are satisfied.

$$0.15 < f1/f2 < 1.3 \quad (1)$$

$$0.15 < f1/f2 < 1.1 \quad (1-1)$$

$$1.8 < f3/f < 4.5 \quad (2)$$

$$2 < f3/f < 4 \quad (2-1)$$

wherein f1 is the focal length of the first lens, f2 is the focal length of the second lens, f3 is the focal length of the third lens, and f is the focal length of the entire lens system.

Conditional Formula (1) is a conditional formula that enables the generation of higher order comatic aberration to be suppressed, while favorably widening the angle o view and correcting distortion. By configuring the imaging lens such that the value of f1/f2 is not less than or equal to the lower limit defined in Conditional Formula (1), an amount of negative refractive power which is necessary to widen the angle of view can be distributed between the first lens L1 and the second lens L2, and light rays that enter from wide angles of view can be bent in a stepwise manner. Therefore, the generation of higher order comatic aberration can be suppressed, while achieving a widening of the angle of view. By configuring the imaging lens such that the value of f1/f2 is not greater than or equal to the upper limit defined in Conditional Formula (1), light beams can be refracted in directions away from the optical axis at the peripheral portions of the second lens L2 and the third lens L3. Therefore, the generation of a large amount of negative distortion can be suppressed.

Conditional Formula (2) is a conditional formula for correcting spherical aberration by imparting an appropriate amount of refractive power to the third lens L3, and for favorably correcting various aberrations at the fourth lens L4 and the lenses subsequent thereto. By configuring the imaging lens such that the value of f3/f is not less than or equal to the lower limit defined in Conditional Formula (2), an appropriate amount of refractive power can be imparted to the third lens L3 such that correction will not become excessive when a great amount of spherical aberration which is generated at the first lens L1 and the second lens L2 is corrected. By configuring the imaging lens such that the value of f3/f is not greater than or equal to the upper limit defined in Conditional Formula (2), correction of a large amount of spherical aberration which is generated at the first lens L1 and the second lens L2 can be prevented from becoming insufficient. As a result, it will not be necessary for the fourth lens L4 and the lenses subsequent thereto to correct an excessive amount of spherical aberration, the degree of freedom in correcting aberrations by the fourth lens L4 and the lenses subsequent thereto will increase, and favorable correction of aberrations becomes possible.

Note that more favorable properties can be obtained if Conditional Formulae (1-1) and (2-1) above are satisfied.

In the imaging lens of the present embodiment, it is preferable for the surface toward the image side of the second lens L2 to be of a concave shape. By adopting this configuration, the operative effects of the first lens L1 through the third lens L3 can be more effectively exhibited.

In addition, it is preferable for the surface toward the image side of the second lens L2 to be of a shape in which a line normal to the surface at an arbitrary point at 30% or greater of the image height of the surface intersects with the optical axis toward the image side of the surface. By adopting this configuration, diverging power becoming excessively strong in the vicinity of the optical axis Z can be prevented, even in the case that a strong diverging power is imparted to the peripheral portion of the second lens L2. Therefore, the generation of a great amount of positive spherical aberration can be prevented.

In addition, it is preferable for Conditional Formula (3) below to be satisfied. Conditional Formula (3) is a conditional formula for suppressing the generation of higher order comatic aberration while widening the angle of view, and for obtaining a long back focus. By configuring the imaging lens such that the value of f12/f is not less than or equal to the lower limit defined in Conditional Formula (3), the combined refractive power of the first lens L1 and the second lens L2 will not become weak, and it will become possible to widen the angle of view and to secure a long back focus. In addition, insertion of filters and the like will be facilitated by securing a long back focus, which is effective in suppressing stray light and the like caused by reflection at an incident surface of an imaging element which is positioned at the image formation plane Sim. By configuring the imaging lens such that the value of f12/f is not greater than the upper limit defined in Conditional Formula (3), the negative combined refractive power will not become excessively strong, and the absolute values of the radii of curvature of each surface can be prevented from becoming small. Therefore, the generation of higher order comatic aberration can be suppressed, and favorable correction of aberrations will become possible. Note that more favorable properties can be obtained if Conditional Formula (3-1) below is satisfied.

$$-1.9 < f12/f < -0.8 \quad (3)$$

$$-1.6 < f12/f < -0.9 \quad (3-1)$$

wherein f12 is the combined focal length of the first lens and the second lens, and f is the focal length of entire lens system.

In addition, it is preferable for Conditional Formula (4) below to be satisfied. In order to widen the angle of view and to favorably correct various aberrations at the first lens L1 and the second lens L2, it is desirable for the second lens L2 to have a refractive power that satisfies Conditional Formula (4). By configuring the imaging lens such that the value of f2/f is not less than or equal to the lower limit defined in Conditional Formula (4), a refractive power suited for widening the angle of view can be obtained. By configuring the imaging lens such that the value of f2/f is not greater than or equal to the upper limit defined in Conditional Formula (4), the generation of higher order comatic aberration can be suppressed, particularly for light beams at peripheral portions. As a result, favorable correction of aberrations becomes possible. Note that more preferable properties can be obtained if Conditional Formula (4-1) below is satisfied.

$$-10 < f2/f < -2 \quad (4)$$

$$-8.5 < f2/f < -2.5 \quad (4-1)$$

wherein f2 is the focal length of the second lens, and f is the focal length of the entire lens system.

In addition, it is preferable for Conditional Formula (5) below to be satisfied. Conditional Formula (5) is a conditional formula for causing light beams, which have been refracted in directions away from the optical axis by the components of the lens system more toward the object side than the surface toward the image side of the third lens L3, to be refracted in directions toward the optical axis Z by the surface toward the image side of the third lens L3, to enable favorable correction of aberrations by the fourth lens L4 through the sixth lens L6. By configuring the imaging lens such that the value of r6/f is not less than or equal to the lower limit defined in Conditional Formula (5), light beams that propagate toward the fourth lens L4 can be refracted in directions that approach the optical axis Z, and the principal light rays of the light beams can be caused to intersect with the optical axis Z at positions remote from the fourth lens L4. Therefore, light beams, particularly those at peripheral angles of view, can be separated when correcting aberrations at the fourth lens L4 and the lenses subsequent thereto. As a result, it will become possible to obtain high resolution. By configuring the imaging lens such that the value of r6/f is not greater than or equal to the upper limit defined in Conditional Formula (5), generation of higher order comatic aberration at this surface can be suppressed. Note that more favorable properties can be obtained if Conditional Formula (5-1) below and/or Conditional Formula (5-2) below is satisfied.

$$-18 < r6/f < -1.7 \quad (5)$$

$$-15.5 < r6/f < -1.9 \quad (5-1)$$

$$-3 < r6/f < -1.9 \quad (5-2)$$

wherein r6 is the radius of curvature of the surface toward the image side of the third lens, and f is the focal length of the entire lens system.

In addition, it is preferable for Conditional Formula (6) below to be satisfied. Conditional Formula (6) is a conditional formula for imparting an appropriate amount of refractive power to the fifth lens L5 in order to favorably focus light beams at each angle of view onto the image formation plane Sim. By configuring the imaging lens such that the value of f5/f is not less than or equal to the lower limit defined in Conditional Formula (6), the light beams can be converged, while increases in excessive negative spherical aberration at the center and increases in higher order comatic aberration at the periphery can be suppressed. As a result, favorable correction of aberrations will become possible with fine corrections by the sixth lens L6 that follows thereafter. By configuring the imaging lens such that the value of f5/f is not greater than or equal to the upper limit defined in Conditional Formula (6), the converging effect, particularly for peripheral light beams, can be appropriately maintained. Therefore, field curvature becoming excessively corrected at the sixth lens L6, which has a negative refractive power, can be prevented. Note that more favorable properties can be obtained in Conditional Formula (6-1) below is satisfied.

$$0.9 < f5/f < 3 \quad (6)$$

$$1.1 < f5/f < 2.5 \quad (6-1)$$

wherein f5 is the focal length of the fifth lens, and f is the focal length of the entire lens system.

In addition, it is preferable for Conditional Formula (7) below to be satisfied. Conditional Formula (7) is a conditional formula for imparting an appropriate amount of refractive power to the sixth lens L6 in order to administer fine correction on light beams, which have been converged by the fifth lens L5, from the center through the periphery and to favorably form images on the image formation plane Sim. By configuring the imaging lens such that the value of f6/f is not less than or equal to the lower limit defined in Conditional Formula (7), negative spherical aberration, which is generated by the fourth lens L4 and the fifth lens L5 having strong refractive powers in order to focus light beams, can be corrected at the sixth lens L6. By configuring the imaging lens such that the value of f6/f is not greater than or equal to the upper limit defined in Conditional Formula (7), the generation of higher order comatic aberration can be suppressed, particularly at peripheral angles of view, while enabling light beams to be refracted in directions away from the optical axis Z. For this reason, the effective diameters of the surface toward the image side of the fifth lens L5 and the surface toward the object side of the sixth lens L6 can be maintained small. Therefore, it will become possible for the absolute values of the radii of curvature of these surfaces to be small. As a result, favorable correction of aberrations, particularly chromatic aberrations, will become possible. Note that more favorable properties can be obtained if Conditional Formula (7-1) below is satisfied.

$$-3 < f6/f < -1 \tag{7}$$

$$-2.5 < f6/f < -1.2 \tag{7-1}$$

wherein f6 is the focal length of the sixth lens, and f is the focal length of the entire lens system.

In addition, it is preferable for Conditional Formula (8) below to be satisfied. By setting the distance between the fifth lens L5 and the sixth lens L6 such that the value of L56/f is not greater than or equal to the upper limit defined in Conditional Formula (8), the generation of higher order aberrations can be suppressed throughout all angles of view, even in the case that the absolute values of the radii of curvature of the surface toward the image side of the fifth lens L5 and the surface toward the object side of the sixth lens L6 are set small, in order to correct aberrations.

$$L56/f < 0.6 \tag{8}$$

wherein L56 is the distance along the optical axis between the fifth lens and the sixth lens, and f is the focal length of the entire lens system.

In addition, it is preferable for Conditional Formula (9) below to be satisfied. By appropriately distributing refractive power among each of the lenses such that Conditional Formula (9) is satisfied, increases in higher order aberrations can be suppressed at each lens, decreasing the influence that the lenses will exert on resolution. Therefore, the allowable degree of production error will increase, and fluctuations in performance can be decreased.

$$0.6 < \max|f/fx| < 0.85 \tag{9}$$

wherein fx is the focal length of an xth lens (x=1~6), and f is the focal length of the entire lens system.

In addition, it is preferable for the combined refractive power of the fourth lens L4 and the fifth lens L5 to be positive, and for the aperture stop St to be positioned between the third lens L3 and the fourth lens L4. Here, the expression "between the third lens L3 and the fourth lens L4" means a position between the surface toward the object side of the third lens L3 and the surface toward the image side of the fourth lens L4. Note that it is preferable for the aperture stop St to be positioned between the surface toward the image side of the third lens L3 and the surface toward the object side of the fourth lens L4. By adopting this configuration, the lens system may be considered to be constituted by: a group having a negative refractive power formed by the first lens L1 and the second lens L2; a group having a positive refractive power formed by the third lens L3; a group having a positive refractive power formed by the fourth lens L4 and the fifth lens L5; and a group having a negative refractive power formed by the sixth lens L6. That is, the arrangement of refractive powers will be substantially symmetrical with respect to the aperture stop St. As a result, favorable correction of aberrations will become possible.

In addition, it is preferable for Conditional Formulae (10) and (11) below to be satisfied. By the fifth lens L5 and the sixth lens L6 being lenses that satisfy Conditional Formulae (10) and (11), favorable correction of chromatic aberrations will become possible. Note that more preferable properties can be obtained if Conditional Formula (10-1) below and/or Conditional Formula (11-1) below are satisfied.

$$55 < v5 \tag{10}$$

$$60 < v5 \tag{10-1}$$

$$v6 < 30 \tag{11}$$

$$v6 < 25 \tag{11-1}$$

wherein v5 is the Abbe's number of the fifth lens, and v6 is the Abbe's number of the sixth lens.

It is preferable for a protective multiple layer film coating to be administered in the case that the present imaging lens is to be utilized in extreme environments. Further, an anti-reflection coating may be administered in addition to the protective coating, in order to reduce ghost light and the like during utilization of the imaging lens.

In addition, in the case that this imaging lens is applied to an imaging apparatus, a cover glass, prisms, and various filters, such as an infrared cutoff filter and a low pass filter, may be provided between the lens system and the image formation plane Sim, depending on the configuration of the imaging apparatus. Note that these filters may be provided among the lenses instead of being provided between the lens system and the image formation plane Sim. As a further alternative, coatings that exhibit the same effects as these filters may be administered on the lens surfaces of the lenses.

Next, examples of numerical values of the imaging lens of the present disclosure will be described.

First, an imaging lens of Example 1 will be described. FIG. 1 is a cross sectional diagram that illustrates the lens configuration of the imaging lens of Example 1. Note that in FIG. 1 and FIGS. 2 through 8 that correspond to Examples 2 through 8 to be described later, the left side is the object side, the right side is the image side, and the aperture stops St illustrated therein do not necessarily represent the sizes and shapes thereof, but only the positions thereof along the optical axis Z.

Basic lens data are shown in Table 1, data related to various items are shown in Table 2, and data related to aspherical surface coefficients are shown in Table 3 for the imaging lens of Example 1. The meanings of the symbols in the tables will be described below with those for Example 1 as an example. However, the meanings of the symbols are basically the same for Examples 2 through 8.

In the lens data of Table 1, surface numbers that sequentially increase from the object side to the image side, with the surface toward the object side of the constituent element at the most object side designated as first, are shown in the column Surface Number. The radii of curvature of each surface are shown in the column Radius of Curvature. The distances between each surface and a next surface are shown in the column Distance. The refractive indices with respect to the d line (wavelength: 587.6 nm) of each optical element are shown in the column nd. The Abbe's numbers with respect to the d line (wavelength: 587.6 nm) of each optical element are shown in the column vd. In addition, in the lens data of Table 1, an inverted triangle symbol "▼" is appended to the surface number of a surface at which a flare cut is positioned, and the effective diameter of the flare cut is shown in the column $FC_\varphi$.

Here, the signs of the radii of curvature are positive in cases that the surface shape is convex toward the object side, and negative in cases that the surface shape is convex toward the image side. Table 1 also shows data regarding the aperture stop St. Text reading "(stop)" is indicated along with a surface number in the column of the surface number at the surface corresponding to the aperture stop.

The values of the focal length f of the entire lens system, the back focus Bf, the F number F No., and the full angle of view 2ω are shown as data related to various items in Table 2.

In the lens data of Table 1, degrees are used as the units for angles and mm are used as the units for lengths. However, it is possible for optical systems to be proportionately enlarged or proportionately reduced and utilized. Therefore, other appropriate units may be used.

In the lens data of Table 1, the surface numbers of aspherical surfaces are appended with the mark "*", and numerical values that represent paraxial radii of curvature are shown as the radii of curvature of the aspherical surfaces. Table 3 shows aspherical surface coefficients related to these aspherical surfaces. In Table 3, "E±n" (n is an integer) means that the numerical values are multiplied by $10^{\pm n}$. The aspherical surface coefficients are the values of the coefficients KA and Am (m=3~16) in the aspherical surface formula below.

$$Zd = \frac{C \times h^2}{1 + \sqrt{1 - KA \times C^2 \times h^2}} + \sum_{m} Am \times h^m$$

wherein Zd is the depth of the aspherical surface (the length of a normal line that extends from a point on the aspherical surface at a height h to a plane perpendicular to the optical axis that contacts the apex of the aspherical surface), h is the height (the distance from the optical axis), C is the inverse of the paraxial radius of curvature, and KA and Am are aspherical surface coefficients (m=3~16).

TABLE 1

Example 1: Lens Data

| Surface Number | Radius of Curvature | Distance | nd | vd | FCφ |
|---|---|---|---|---|---|
| 1 | 20.4989 | 1.0200 | 1.58913 | 61.13 | |
| 2 | 3.8397 | 2.1830 | | | |
| *3 | −6.6801 | 0.7505 | 1.53112 | 55.30 | |
| *4 | −403.5513 | 0.9137 | | | |
| 5 | −32.8213 | 2.8524 | 1.69680 | 55.53 | |
| 6 | −6.0304 | 1.4000 | | | |
| 7 (stop) | ∞ | 2.6141 | | | |
| *8 ▼ | 10.8703 | 1.2000 | 1.53112 | 55.30 | 3.87 |
| *9 | −4.3607 | 0.2000 | | | |
| 10 | 37.3079 | 2.2435 | 1.67790 | 55.34 | |
| 11 | −3.7589 | 0.1350 | | | |
| *12 | −3.1729 | 1.0000 | 1.63367 | 23.82 | |
| 13 | 25.0019 | 3.6983 | | | |

TABLE 2

Example 1: Items

| | |
|---|---|
| f | 3.15 |
| Bf | 3.70 |
| FNo. | 2.30 |
| 2ω (°) | 119.0 |

TABLE 3

Example 1: Aspherical Surface Coefficients

| | Surface Number | | |
|---|---|---|---|
| | 3 | 4 | 8 |
| KA | 2.6333077E+00 | −3.1281526E+00 | 3.6619142E+00 |
| A3 | −1.3752455E−18 | −2.9226644E−17 | −5.4300948E−18 |
| A4 | 2.0651146E−02 | 1.4315520E−02 | −4.7573916E−03 |
| A5 | −3.9873133E−03 | 1.0045646E−02 | 1.0781272E−02 |
| A6 | −8.0026612E−05 | −7.5491506E−03 | −4.1072455E−03 |
| A7 | −7.8498773E−05 | 8.9684228E−04 | −8.1620684E−03 |
| A8 | 3.1982832E−05 | 5.8124620E−04 | 7.1462927E−03 |
| A9 | 1.9813944E−05 | −5.1821960E−05 | 7.3504480E−04 |
| A10 | −5.9470159E−06 | −5.8402135E−05 | −2.1463516E−03 |
| A11 | −9.3369882E−07 | −7.1684650E−08 | 1.7379031E−04 |
| A12 | 3.5036862E−07 | 5.4423458E−06 | 3.0321887E−04 |
| A13 | 2.1054030E−08 | −2.6591387E−07 | −4.2999248E−05 |
| A14 | −9.9928964E−09 | −2.7491450E−07 | −1.9105442E−05 |
| A15 | −1.6341649E−10 | 8.9496614E−09 | 2.8867004E−06 |
| A16 | 1.1610788E−10 | 8.0782936E−09 | 1.7154804E−07 |

| | Surface Number | |
|---|---|---|
| | 9 | 12 |
| KA | 1.1502689E+00 | 3.8851332E−01 |
| A3 | −3.6087793E−18 | −5.6662176E−19 |
| A4 | 7.3644740E−03 | −4.4634429E−05 |
| A5 | −3.4229822E−03 | 2.8625802E−03 |
| A6 | 8.8195790E−04 | −1.1365009E−03 |
| A7 | 6.5515226E−04 | −7.1702264E−04 |
| A8 | −2.6021296E−04 | 3.8700337E−04 |
| A9 | −1.7200715E−05 | 8.8942297E−05 |
| A10 | 2.0104655E−05 | −6.8159137E−05 |
| A11 | −9.4543994E−07 | −5.0995989E−06 |
| A12 | −1.2042158E−07 | 5.5486622E−06 |
| A13 | −3.8539461E−08 | 1.2880219E−07 |
| A14 | −6.3919014E−08 | −1.9460092E−07 |
| A15 | 4.2315332E−09 | 5.1946630E−12 |
| A16 | 2.4376563E−09 | 2.3273169E−09 |

Figure 9:
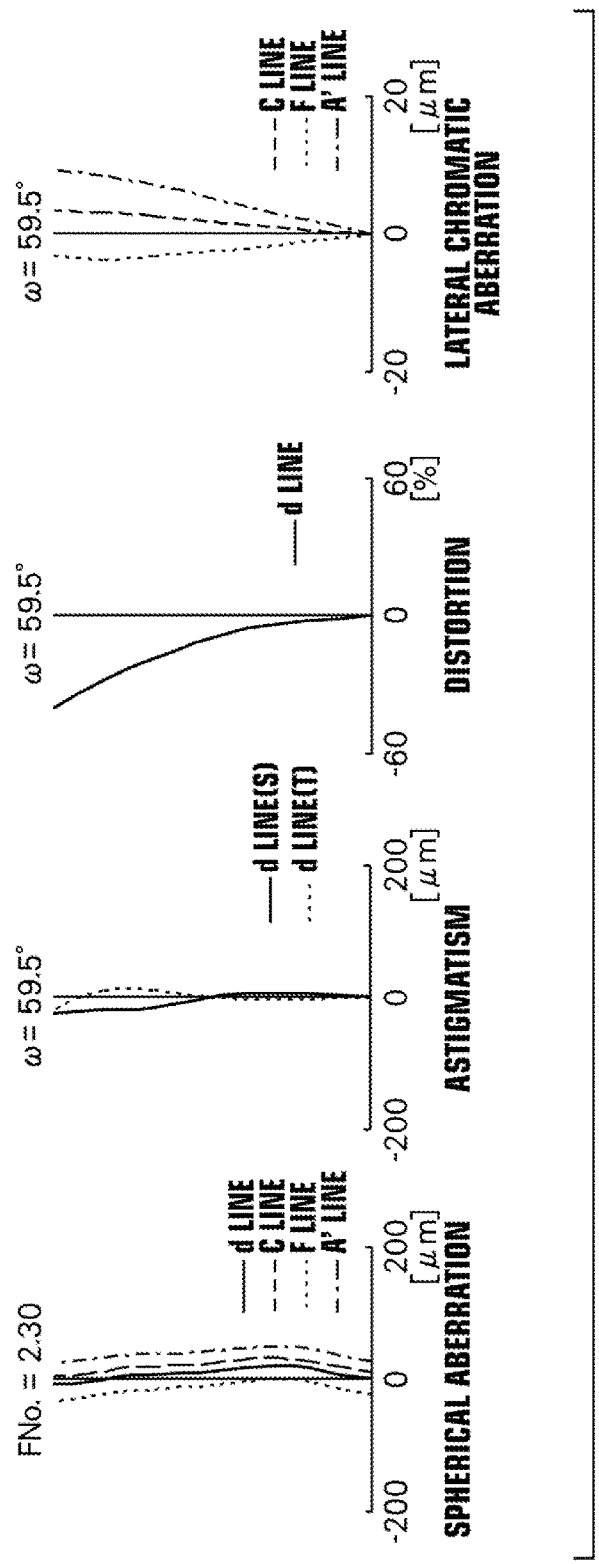
FIG. 9 is a collection of diagrams that illustrate aberrations of the imaging lens according to Example 1.

FIG. 9 is a collection of diagrams that illustrate various aberrations of the imaging lens of Example 1. In FIG. 9, diagrams that illustrate spherical aberration, astigmatism, distortion, and lateral chromatic aberration are illustrated in this order from the left side of the drawing sheet. These aberration diagrams illustrate aberrations in a state when the object distance is infinity. The diagram that illustrates spherical aberration shows aberrations related to the d line (wavelength: 587.6 nm), the C line (wavelength: 656.3 nm), the F line (wavelength: 486.1 nm), and the A' line (wavelength: 768.2 nm) as a solid line, a long broken line, a dotted line, and a single dot chained line, respectively. In the diagram that illustrates astigmatism, aberrations in the sagittal direction and aberrations in the tangential direction are indicated by a solid line and a dotted line, respectively. In the diagram that illustrates lateral chromatic diagram, aberrations related to the C line (wavelength: 656.3 nm), the F line (wavelength: 486.1 nm), and the A' line (wavelength: 768.2 nm) are shown as a long broken line, a dotted line, and a single dot chained line, respectively. In the diagram that illustrates spherical aberration, "FNo." denotes the F number. In the other diagrams that illustrate the aberrations, ω denotes half angles of view.

Figure 17:
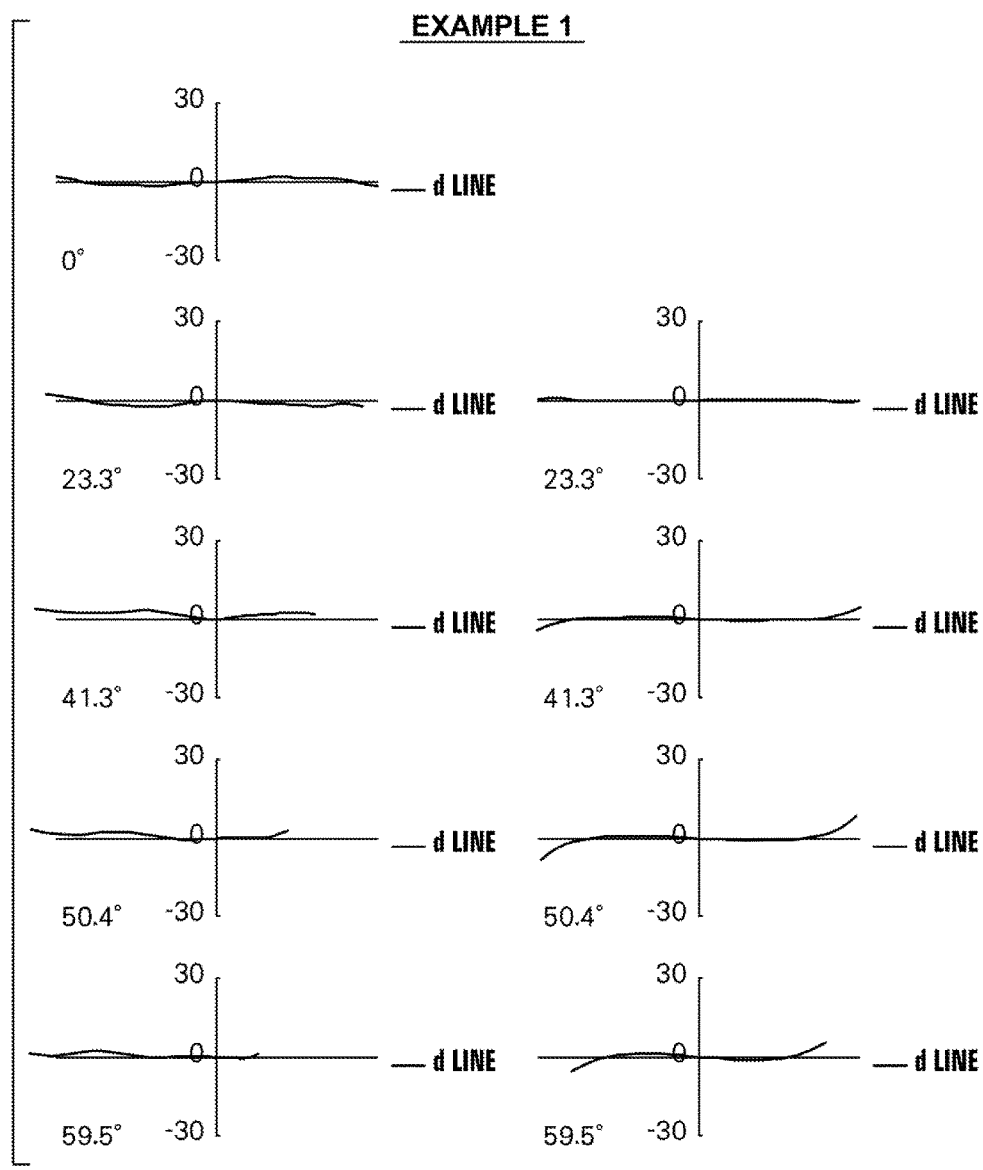
FIG. 17 is a collection of diagrams that illustrate transverse aberrations of the imaging lens of Example 1.

FIG. 17 is a collection of diagrams that illustrate transverse aberrations of the imaging lens of Example 1. Transverse aberrations related to the tangential direction are illustrated at the left side of the drawing sheet, and transverse aberrations related to the sagittal direction are illustrated at the right side of the drawing sheet. The transverse aberration diagrams illustrate transverse aberrations at the center of an imaging plane at the top row, and transverse aberrations at each of a plurality of image heights in the lower rows.

The symbols, the meanings, and the manners in which the various pieces of data are described in the description of Example 1 above are the same for the examples to be described below unless otherwise noted. Therefore, redundant descriptions will be omitted hereinafter.

Figure 10:
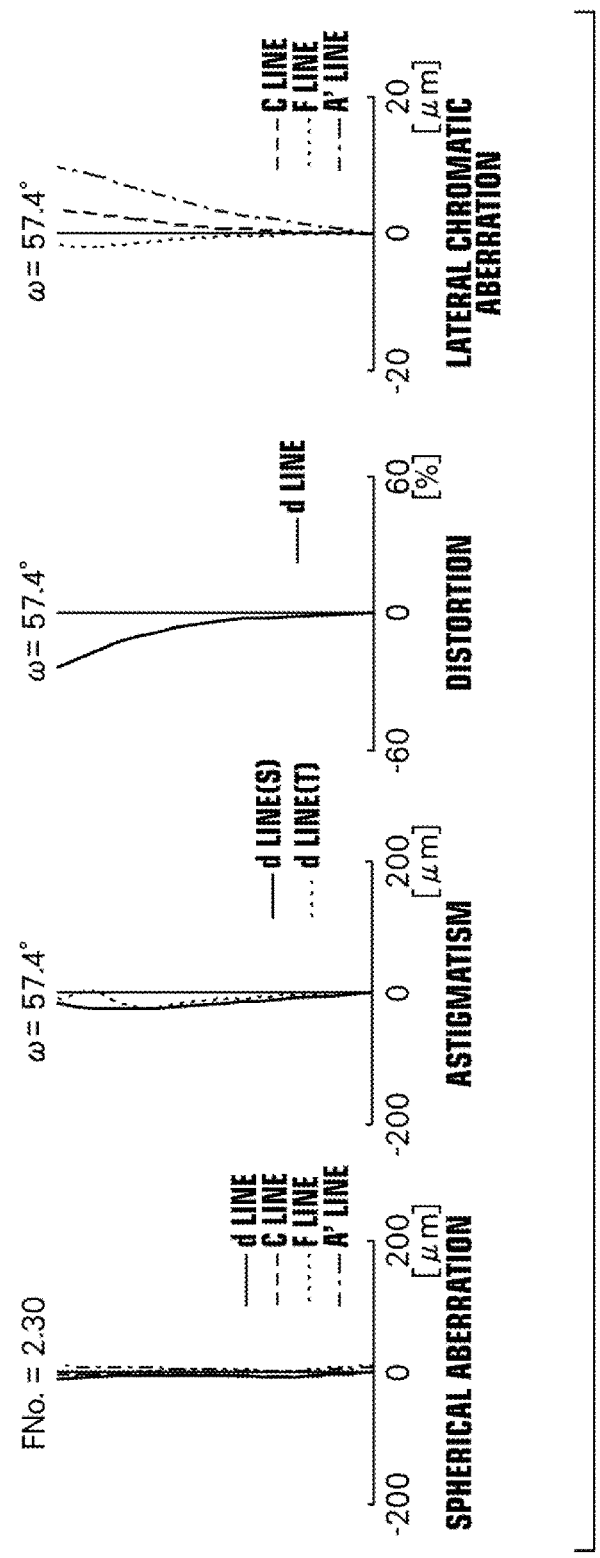
FIG. 10 is a collection of diagrams that illustrate aberrations of the imaging lens according to Example 2.
Figure 18:
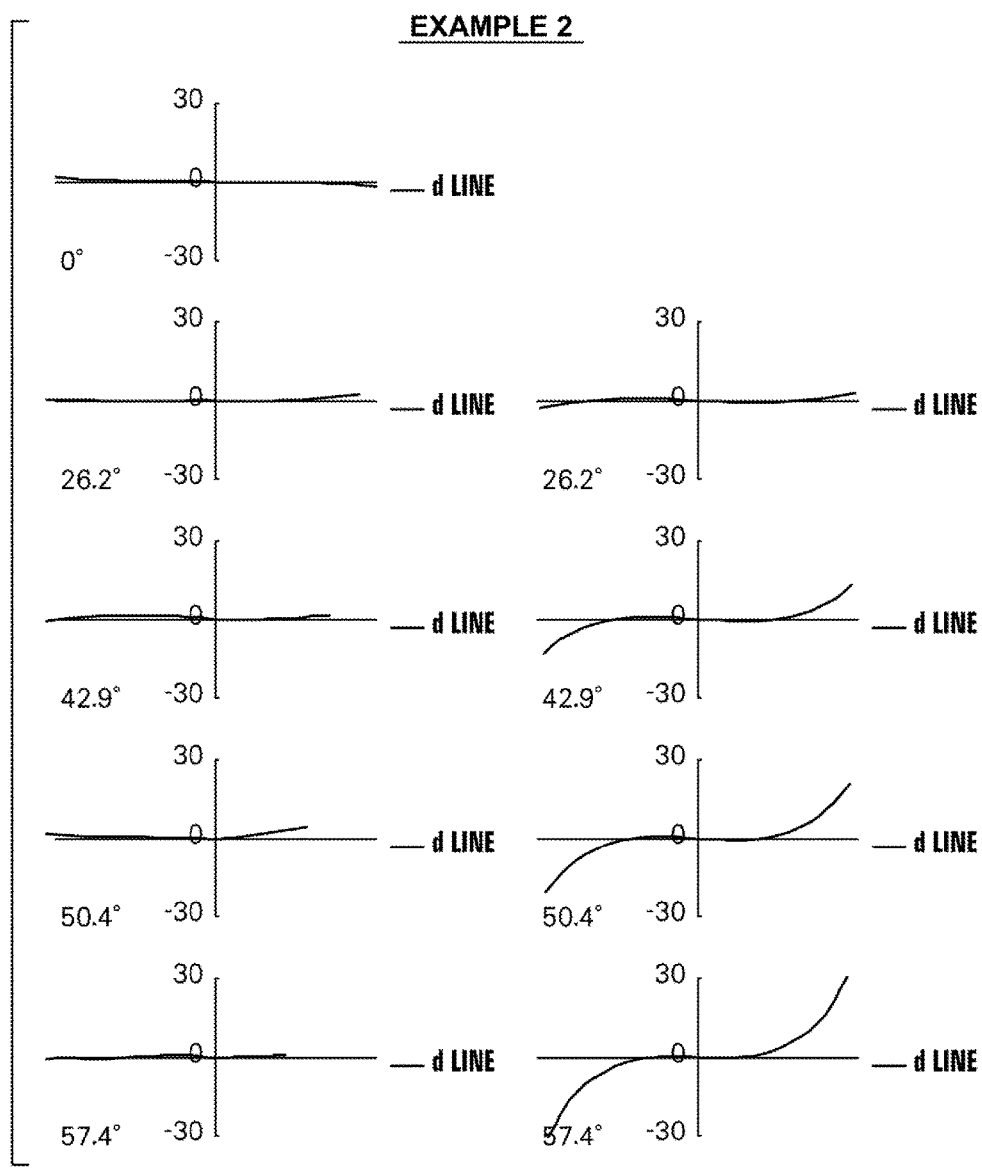
FIG. 18 is a collection of diagrams that illustrate transverse aberrations of the imaging lens of Example 2.

Next, an imaging lens of Example 2 will be described. FIG. 2 is a cross sectional diagram that illustrates the lens configuration of the imaging lens of Example 2. Basic lens data are shown in Table 4, data related to various items are shown in Table 5, and aspherical surface coefficients are shown in Table 6 for the imaging lens of Example 2. In addition, FIG. 10 is a collection of diagrams that illustrate various aberrations of the imaging lens of Example 2, and FIG. 18 is a collection of diagrams that illustrate transverse aberrations of the imaging lens of Example 2.

TABLE 4

Example 2: Lens Data

| Surface Number | Radius of Curvature | Distance | nd | vd | FCφ |
|---|---|---|---|---|---|
| 1 | 17.1480 | 1.0000 | 1.80400 | 46.58 | |
| 2 | 4.0570 | 1.5074 | | | |
| *3 | 56.3603 | 0.9790 | 1.53112 | 55.30 | |
| *4 | 3.8855 | 1.8527 | | | |
| 5 | −125000.0000 | 2.0453 | 1.80400 | 46.58 | |
| 6 | −6.6789 | 1.7783 | | | |
| 7 (stop) | ∞ | 0.8487 | | | |
| *8 | −39.1619 | 1.2000 | 1.53112 | 55.30 | |
| *9 | −11.2414 | 0.8753 | | | |
| *10 ▼ | 4.3505 | 2.7492 | 1.61881 | 63.85 | 4.09 |
| *11 | −3.3303 | 0.1350 | | | |
| 12 | −4.4089 | 1.0105 | 1.92286 | 18.90 | |
| 13 | −57.9408 | 3.8682 | | | |

TABLE 5

Example 2: Items

| | |
|---|---|
| f' | 2.68 |
| Bf' | 3.87 |
| FNo. | 2.30 |
| 2ω (°) | 114.8 |

TABLE 6

Example 2: Aspherical Surface Coefficients

| | Surface Number | | |
|---|---|---|---|
| | 3 | 4 | 8 |
| KA | 1.0000000E+00 | 1.0000000E+00 | 1.0000000E+00 |
| A3 | 6.2301946E−18 | 6.1742992E−18 | −2.4380374E−17 |
| A4 | 2.7180914E−02 | 3.0182418E−02 | −3.8356292E−03 |
| A5 | −1.1486177E−02 | −9.6427394E−03 | −1.1029338E−02 |
| A6 | 2.7156749E−03 | 3.1245738E−03 | 1.5400501E−02 |
| A7 | −2.4235320E−04 | −4.4139666E−04 | −9.7081626E−03 |
| A8 | −1.8511901E−04 | −4.2756046E−04 | 1.4323100E−03 |
| A9 | 6.4033603E−05 | 6.4189346E−05 | 9.3783844E−04 |
| A10 | −6.1329234E−06 | 9.2727708E−06 | −3.3726212E−04 |

| | Surface Number | | |
|---|---|---|---|
| | 9 | 10 | 11 |
| KA | 1.0000000E+00 | 1.0000000E+00 | 1.0000000E+00 |
| A3 | −5.1746399E−17 | 0.0000000E+00 | 0.0000000E+00 |

TABLE 6-continued

Example 2: Aspherical Surface Coefficients

| A4 | −1.6057846E−02 | −8.1837470E−03 | 8.1284816E−03 |
| A5 | −3.2040098E−03 | −5.1940199E−04 | 2.2511619E−03 |
| A6 | 7.4058969E−03 | 1.9668779E−03 | −2.7505922E−03 |
| A7 | −4.1098711E−03 | −4.5759219E−04 | 1.2355379E−03 |
| A8 | 6.4374836E−04 | −1.1655313E−04 | −1.8247034E−05 |
| A9 | 2.1569772E−04 | 7.5297509E−05 | −1.3689137E−04 |
| A10 | −7.9930065E−05 | −8.2799491E−06 | 3.4250884E−05 |

Figure 11:
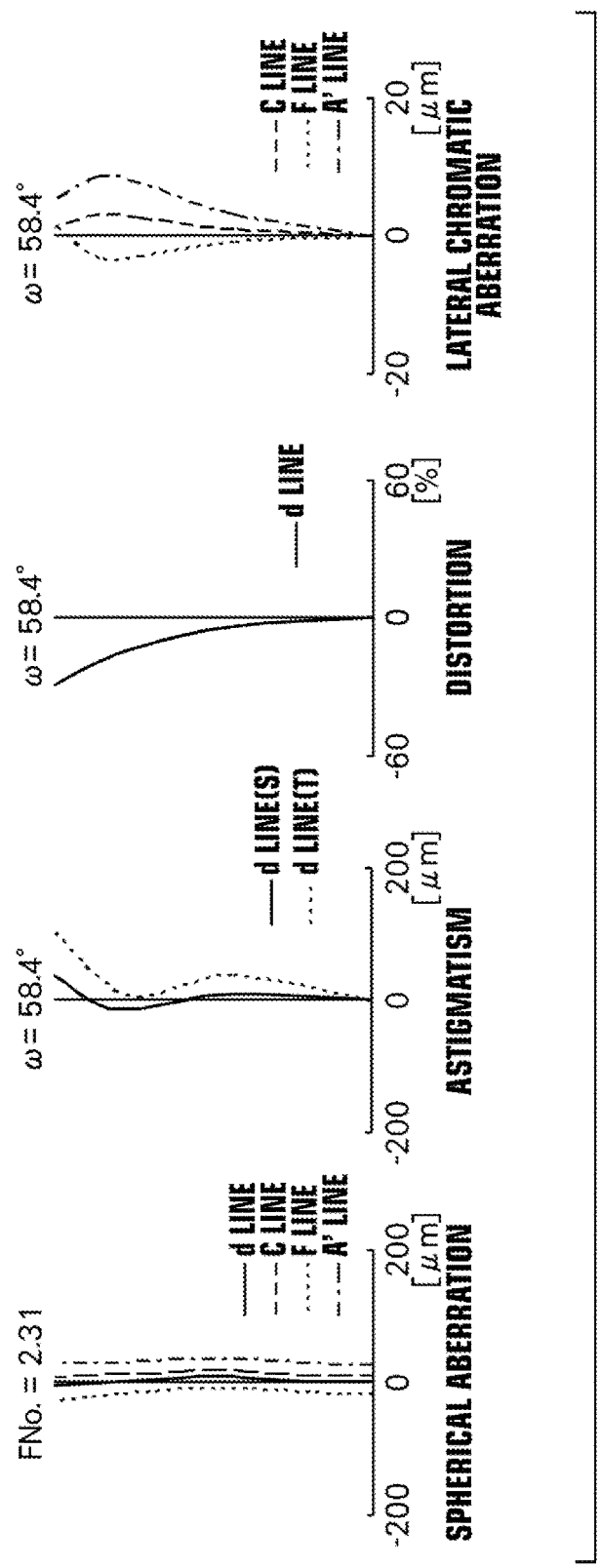
FIG. 11 is a collection of diagrams that illustrate aberrations of the imaging lens according to Example 3.
Figure 19:
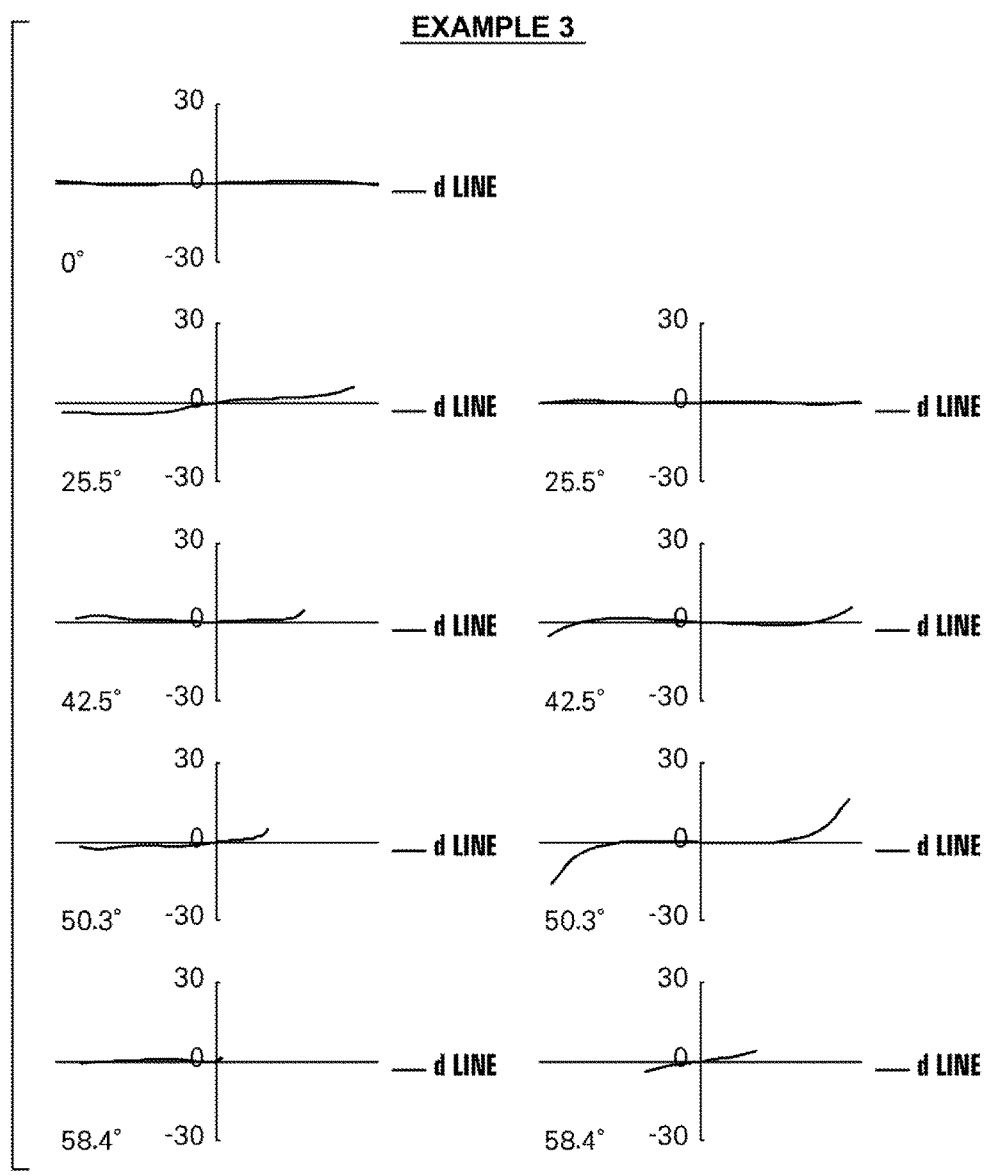
FIG. 19 is a collection of diagrams that illustrate transverse aberrations of the imaging lens of Example 3.

Next, an imaging lens of Example 3 will be described. FIG. 3 is a cross sectional diagram that illustrates the lens configuration of the imaging lens of Example 3. Basic lens data are shown in Table 7, data related to various items are shown in Table 8, and aspherical surface coefficients are shown in Table 9 for the imaging lens of Example 3. In addition, FIG. 11 is a collection of diagrams that illustrate various aberrations of the imaging lens of Example 3, and FIG. 19 is a collection of diagrams that illustrate transverse aberrations of the imaging lens of Example 3.

TABLE 7

Example 3: Lens Data

| Surface Number | Radius of Curvature | Distance | nd | vd | FCφ |
|---|---|---|---|---|---|
| 1 | 40.7415 | 1.0500 | 1.80400 | 46.58 | |
| 2 | 4.5115 | 2.1539 | | | |
| *3 | −4.2149 | 1.0565 | 1.53112 | 55.30 | |
| *4 | −75.1880 | 1.0172 | | | |
| 5 | 18.8929 | 2.6077 | 1.78590 | 44.20 | |
| 6 | −6.0075 | 1.7783 | | | |
| 7 ▼ | | 0.4000 | | | 2.61 |
| 8 (stop) | ∞ | 1.7076 | | | |
| *9 | −8.3449 | 1.0000 | 1.63367 | 23.82 | |
| *10 ▼ | −12.2915 | 0.4428 | | | 3.35 |
| *11 ▼ | 3.4805 | 2.3117 | 1.53112 | 55.30 | 4.00 |
| *12 | −2.9513 | 0.1250 | | | |
| 13 | −4.6993 | 1.0008 | 1.92286 | 18.90 | |
| 14 | −25.6148 | 3.7065 | | | |

TABLE 8

Example 3: Items

| | |
|---|---|
| f' | 2.78 |
| Bf' | 3.71 |
| FNo. | 2.31 |
| 2ω (°) | 116.8 |

TABLE 9

Example 3: Aspherical Surface Coefficients

| | Surface Number | | |
|---|---|---|---|
| | 3 | 4 | 8 |
| KA | 1.0299525E+00 | 1.5406378E+00 | −1.7915369E+00 |
| A3 | 8.5051071E−18 | 0.0000000E+00 | 0.0000000E+00 |
| A4 | 4.1559475E−02 | 3.5184955E−02 | 2.0166294E−02 |
| A5 | −1.4568376E−02 | −9.8558669E−03 | −1.4368886E−02 |
| A6 | 1.6593866E−03 | 1.1343604E−03 | 1.0210056E−02 |
| A7 | 2.6258958E−04 | 2.9605818E−04 | −6.1830544E−03 |
| A8 | −1.3220585E−04 | −2.1078432E−04 | 9.2636111E−04 |
| A9 | 2.0290748E−05 | 5.0738546E−06 | 5.5821670E−04 |
| A10 | −1.1262958E−06 | 5.9581641E−06 | −2.0586174E−04 |

TABLE 9-continued

Example 3: Aspherical Surface Coefficients

| | Surface Number | | |
|---|---|---|---|
| | 9 | 10 | 11 |
| KA | 4.4518022E+00 | 1.0847375E+00 | 1.0012070E+00 |
| A3 | −7.7683244E−18 | 1.0565333E−17 | −2.2279681E−17 |
| A4 | 2.2472574E−02 | 9.4942143E−03 | 2.1966207E−02 |
| A5 | −1.6057142E−02 | −1.3853241E−02 | −1.5118548E−02 |
| A6 | 4.1828501E−03 | 6.2554921E−03 | 1.1559984E−02 |
| A7 | 1.6307142E−04 | −8.2665772E−04 | −3.4322944E−03 |
| A8 | −5.8466631E−04 | −3.3287878E−04 | 5.6433952E−05 |
| A9 | 1.5488098E−05 | 1.7848807E−04 | 2.6798421E−04 |
| A10 | 2.3451431E−05 | −2.5897155E−05 | −4.4288928E−05 |

Figure 12:
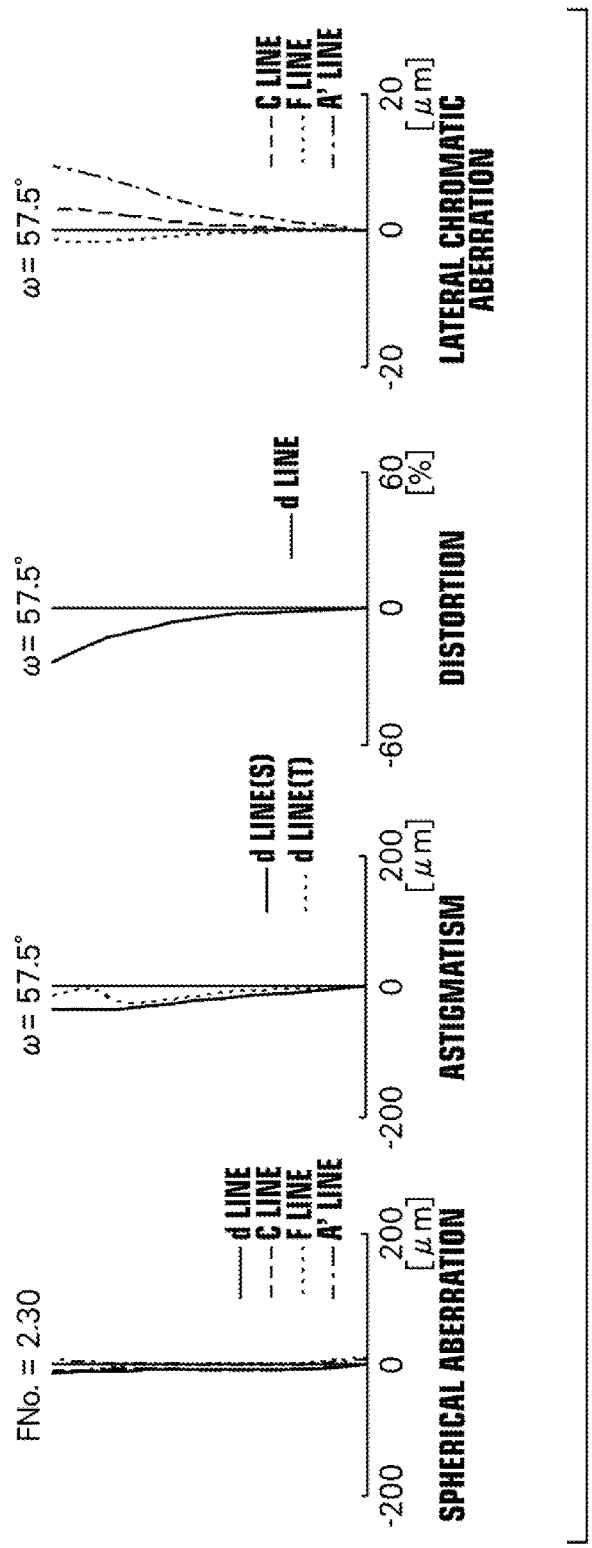
FIG. 12 is a collection of diagrams that illustrate aberrations of the imaging lens according to Example 4.
Figure 20:
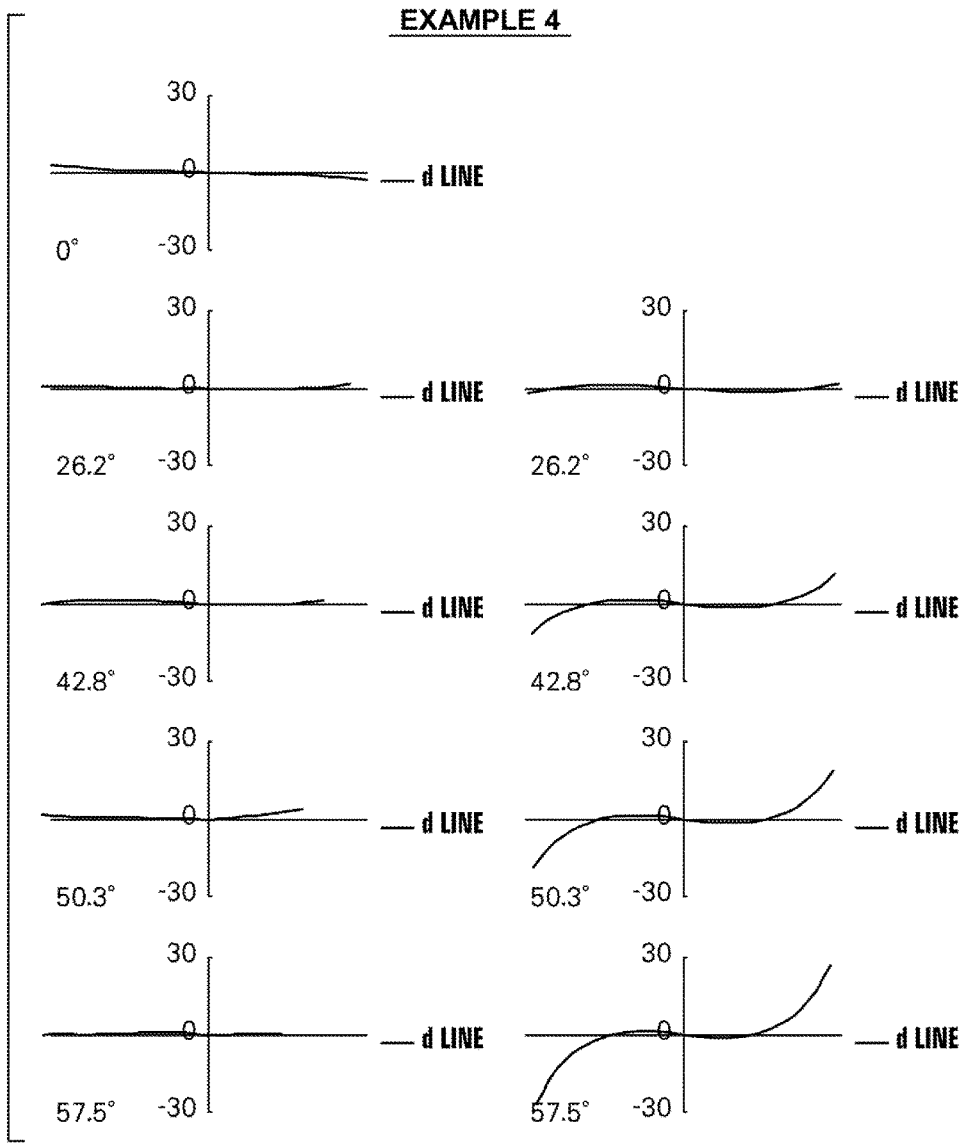
FIG. 20 is a collection of diagrams that illustrate transverse aberrations of the imaging lens of Example 4.

Next, an imaging lens of Example 4 will be described. FIG. 4 is a cross sectional diagram that illustrates the lens configuration of the imaging lens of Example 4. Basic lens data are shown in Table 10, data related to various items are shown in Table 11, and aspherical surface coefficients are shown in Table 12 for the imaging lens of Example 4. In addition, FIG. 12 is a collection of diagrams that illustrate various aberrations of the imaging lens of Example 4, and FIG. 20 is a collection of diagrams that illustrate transverse aberrations of the imaging lens of Example 4.

TABLE 10

Example 4: Lens Data

| Surface Number | Radius of Curvature | Distance | nd | vd | FCφ |
|---|---|---|---|---|---|
| 1 | 16.5590 | 1.0000 | 1.80400 | 46.58 | |
| 2 | 4.0574 | 1.4650 | | | |
| *3 | 40.5416 | 0.9482 | 1.53112 | 55.30 | |
| *4 | 3.7753 | 1.8645 | | | |
| 5 | −125000.0000 | 2.1000 | 1.80400 | 46.58 | |
| 6 | −7.0588 | 1.7783 | | | |
| 7 (stop) | ∞ | 0.8094 | | | |
| *8 | −43.0589 | 1.2665 | 1.53112 | 55.30 | |
| *9 | −7.5443 | 0.9121 | | | |
| *10 ▼ | 5.0213 | 2.7091 | 1.61881 | 63.85 | 4.11 |
| *11 | −3.2613 | 0.1350 | | | |
| 12 | −4.1680 | 1.0000 | 1.92286 | 18.90 | |
| 13 | −37.7672 | 3.8616 | | | |

TABLE 11

Example 4: Items

| | |
|---|---|
| f' | 2.68 |
| Bf' | 3.86 |
| FNo. | 2.30 |
| 2ω (°) | 115.0 |

TABLE 12

Example 4: Aspherical Surface Coefficients

| | Surface Number | | |
|---|---|---|---|
| | 3 | 4 | 8 |
| KA | 1.0000000E+00 | 1.0000000E+00 | 1.0000000E+00 |
| A3 | 1.9067861E−17 | −1.1472075E−17 | 2.5339524E−17 |
| A4 | 2.7642166E−02 | 2.9813577E−02 | −3.0406206E−03 |
| A5 | −1.1923954E−02 | −9.0433379E−03 | −1.2830141E−02 |
| A6 | 2.8712835E−03 | 2.6158786E−03 | 1.6753880E−02 |
| A7 | −2.4910530E−04 | −3.3854418E−04 | −1.0534460E−02 |
| A8 | −1.9827280E−04 | −3.9954139E−04 | 1.5151759E−03 |

TABLE 12-continued

Example 4: Aspherical Surface Coefficients

| A9 | 6.7905072E−05 | 5.0193958E−05 | 1.0489993E−03 |
| A10 | −6.4696913E−06 | 1.0576577E−05 | −3.7710768E−04 |

| | Surface Number | | |
|---|---|---|---|
| | 9 | 10 | 11 |
| KA | 1.0000000E+00 | 1.0000000E+00 | 1.0000000E+00 |
| A3 | 0.0000000E+00 | −5.2738271E−19 | 0.0000000E+00 |
| A4 | −1.2103032E−02 | −5.6325722E−03 | 7.9163705E−03 |
| A5 | −4.3890950E−03 | −6.8894450E−04 | 1.6559227E−03 |
| A6 | 7.1229371E−03 | 1.5745687E−03 | −2.0202857E−03 |
| A7 | −4.0458756E−03 | −3.3373649E−04 | 9.4485462E−04 |
| A8 | 6.5683833E−04 | −1.0274161E−04 | −4.7513070E−05 |
| A9 | 2.1287808E−04 | 6.3400512E−05 | −9.1323672E−05 |
| A10 | −8.0300094E−05 | −6.3728663E−06 | 2.5896587E−05 |

Figure 13:
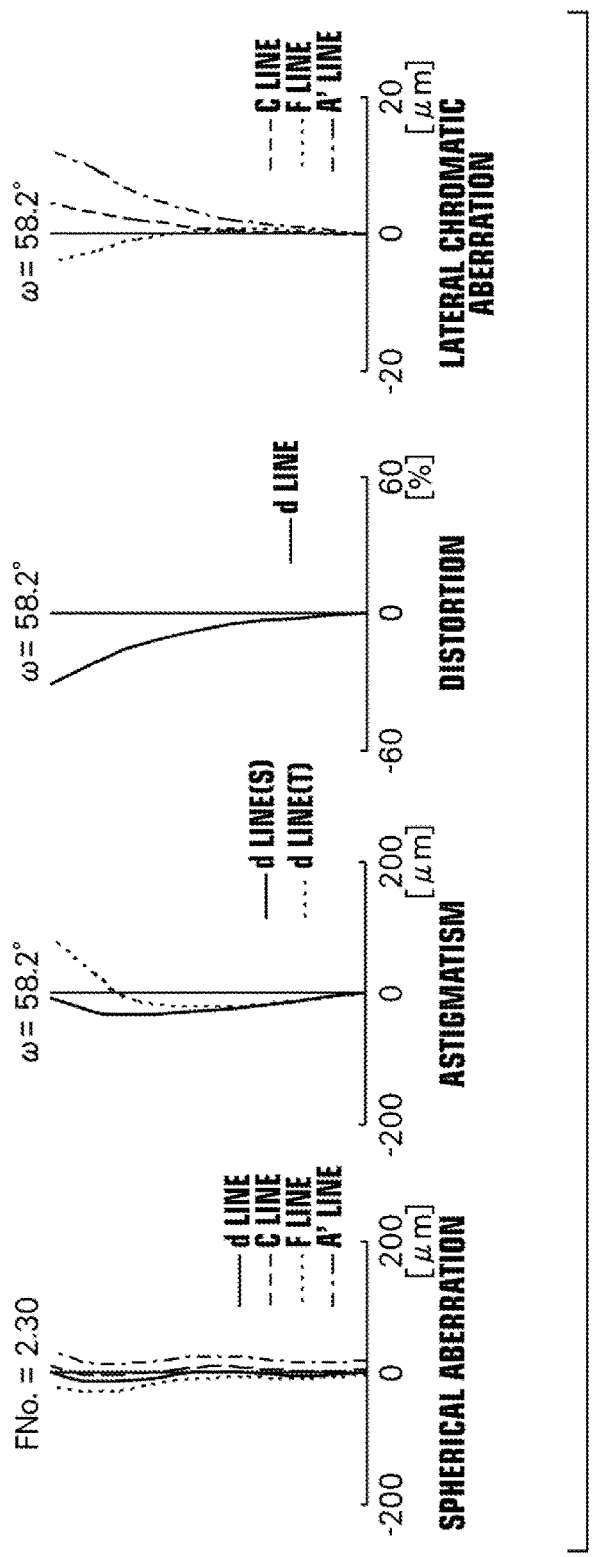
FIG. 13 is a collection of diagrams that illustrate aberrations of the imaging lens according to Example 5.
Figure 21:
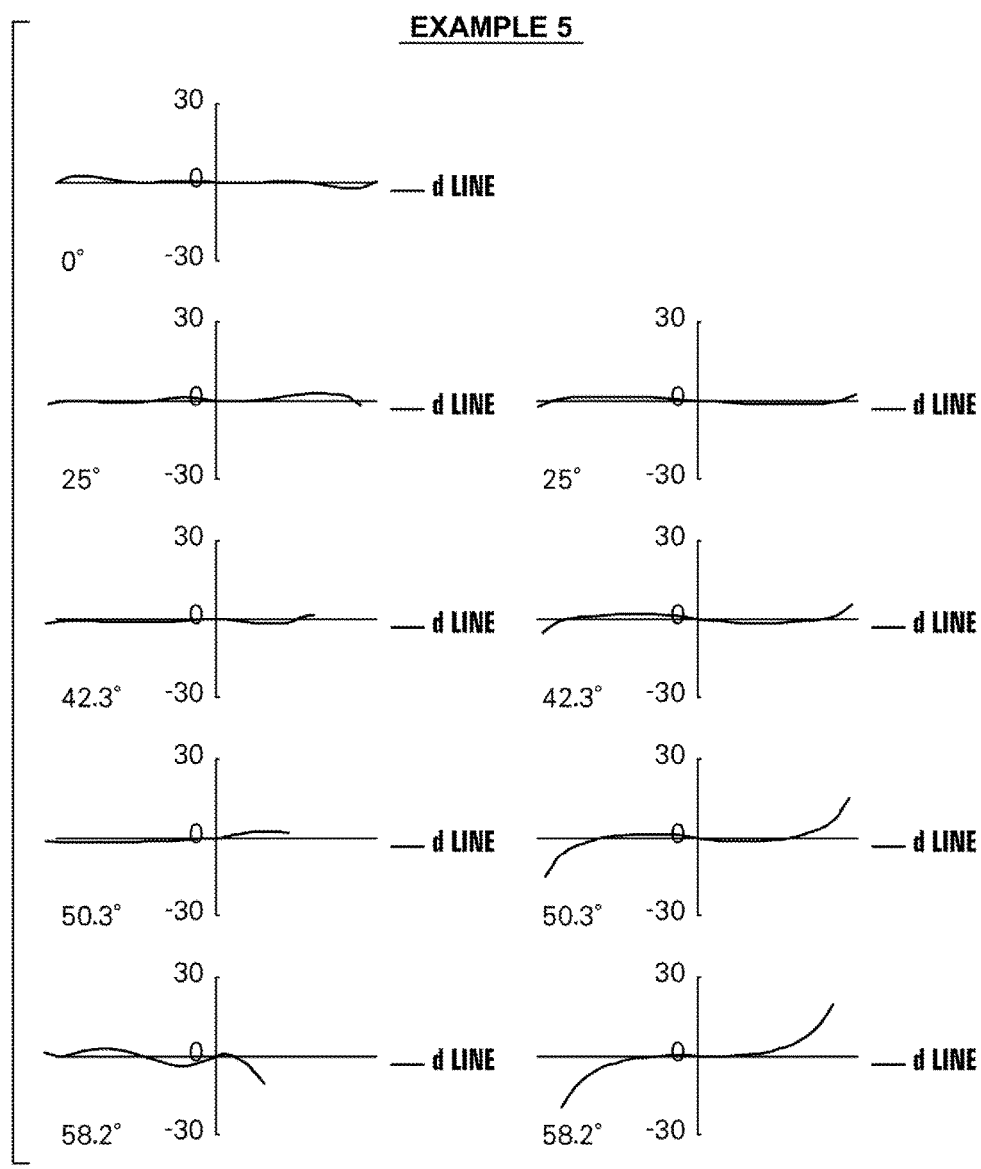
FIG. 21 is a collection of diagrams that illustrate transverse aberrations of the imaging lens of Example 5.

Next, an imaging lens of Example 5 will be described. FIG. 5 is a cross sectional diagram that illustrates the lens configuration of the imaging lens of Example 5. Basic lens data are shown in Table 13, data related to various items are shown in Table 14, and aspherical surface coefficients are shown in Table 15 for the imaging lens of Example 5. In addition, FIG. 13 is a collection of diagrams that illustrate various aberrations of the imaging lens of Example 5, and FIG. 21 is a collection of diagrams that illustrate transverse aberrations of the imaging lens of Example 5.

TABLE 13

Example 5: Lens Data

| Surface Number | Radius of Curvature | Distance | nd | vd | FCφ |
|---|---|---|---|---|---|
| 1 | 228.2584 | 1.0000 | 1.80400 | 46.58 | |
| 2 | 3.8429 | 1.6335 | | | |
| *3 | −10.0651 | 2.2000 | 1.53112 | 55.30 | |
| *4 | −55.1329 | 0.8532 | | | |
| 5 | −166666.6667 | 2.4357 | 1.80400 | 46.58 | |
| 6 | −5.8233 | 1.7783 | | | |
| 7 (stop) | ∞ | 1.8288 | | | |
| *8 | −9.4408 | 0.9789 | 1.63367 | 23.82 | |
| *9 | −10.4372 | 0.1300 | | | |
| *10 ▼ | 3.5426 | 2.4000 | 1.53112 | 55.30 | 3.83 |
| *11 | −2.8572 | 0.1300 | | | |
| 12 | −5.1000 | 1.2327 | 1.92286 | 18.90 | |
| 13 | 26.3220 | 3.5023 | | | |

TABLE 14

Example 5: Items

| | |
|---|---|
| f' | 2.87 |
| Bf' | 3.50 |
| FNo. | 2.30 |
| 2ω (°) | 116.4 |

TABLE 15

Example 5: Aspherical Surface Coefficients

| | Surface Number | | |
|---|---|---|---|
| | 3 | 4 | 8 |
| KA | 1.0000000E+00 | 1.0000000E+00 | 1.0000000E+00 |
| A3 | −1.7347279E−18 | 0.0000000E+00 | 1.2133643E−17 |
| A4 | 9.0547914E−03 | 8.7727822E−03 | 1.6689016E−02 |
| A5 | 2.3712507E−04 | 2.7184851E−03 | −8.3507744E−03 |

TABLE 15-continued

| Example 5: Aspherical Surface Coefficients | | | |
|---|---|---|---|
| A6 | −2.4194279E−04 | −1.4752149E−03 | 1.0649061E−02 |
| A7 | −6.7950360E−05 | 3.1084942E−04 | −7.5817871E−03 |
| A8 | 6.8335375E−06 | 1.4291042E−05 | 1.6441056E−03 |
| A9 | 7.7545917E−06 | −1.9178495E−05 | 6.4836626E−04 |
| A10 | −1.2260121E−06 | 5.2616458E−08 | −3.3088937E−04 |

| | Surface Number | | |
|---|---|---|---|
| | 9 | 10 | 11 |
| KA | 1.0000000E+00 | 1.0000000E+00 | 1.0000000E+00 |
| A3 | 8.8338318E−18 | −1.1875349E−17 | −5.3033494E−17 |
| A4 | −7.4345497E−03 | −1.8729974E−02 | 3.1831774E−02 |
| A5 | 2.2118965E−02 | 1.1709718E−02 | −6.1531221E−02 |
| A6 | −1.0000354E−02 | 2.2596119E−03 | 7.0890522E−02 |
| A7 | −1.4720831E−03 | −5.7716912E−03 | −3.3821948E−02 |
| A8 | 2.6487029E−03 | 1.6597222E−03 | 1.4126421E−03 |
| A9 | −3.0285049E−04 | 4.8183095E−04 | 4.1692269E−03 |
| A10 | −1.9471899E−04 | −2.1900226E−04 | −9.9495484E−04 |

Figure 14:
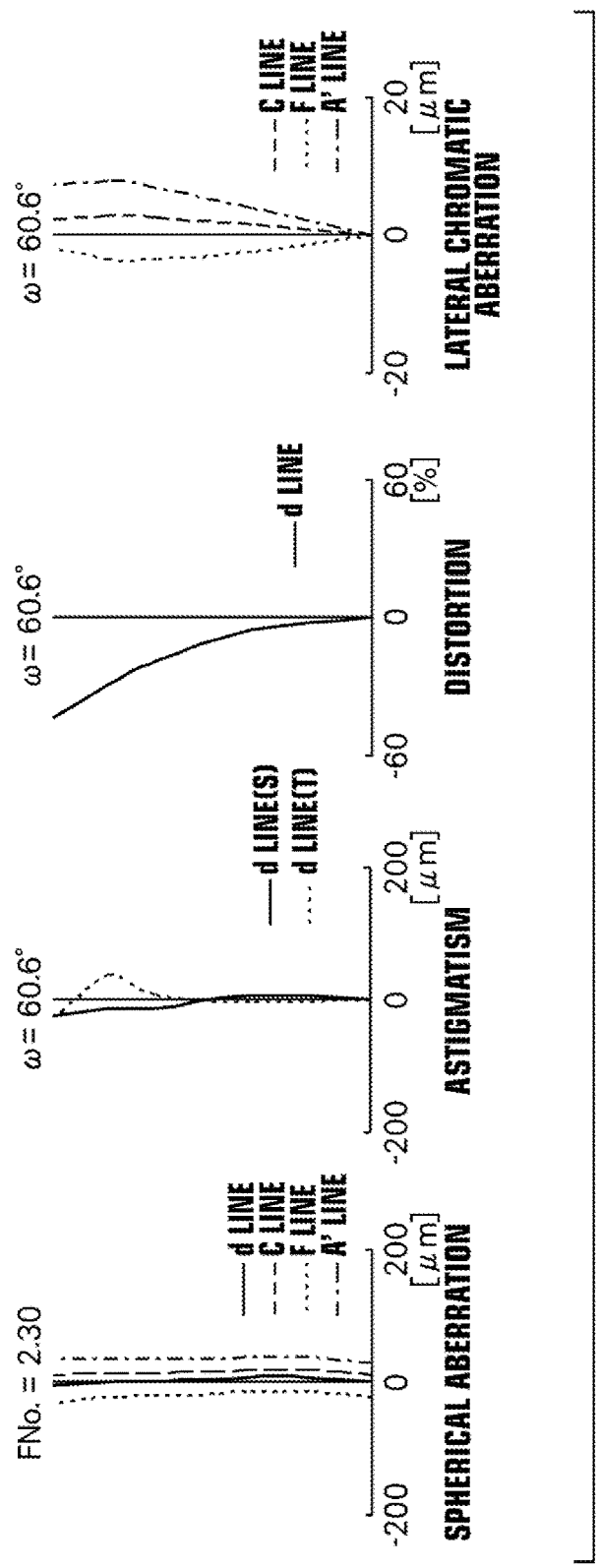
FIG. 14 is a collection of diagrams that illustrate aberrations of the imaging lens according to Example 6.
Figure 22:
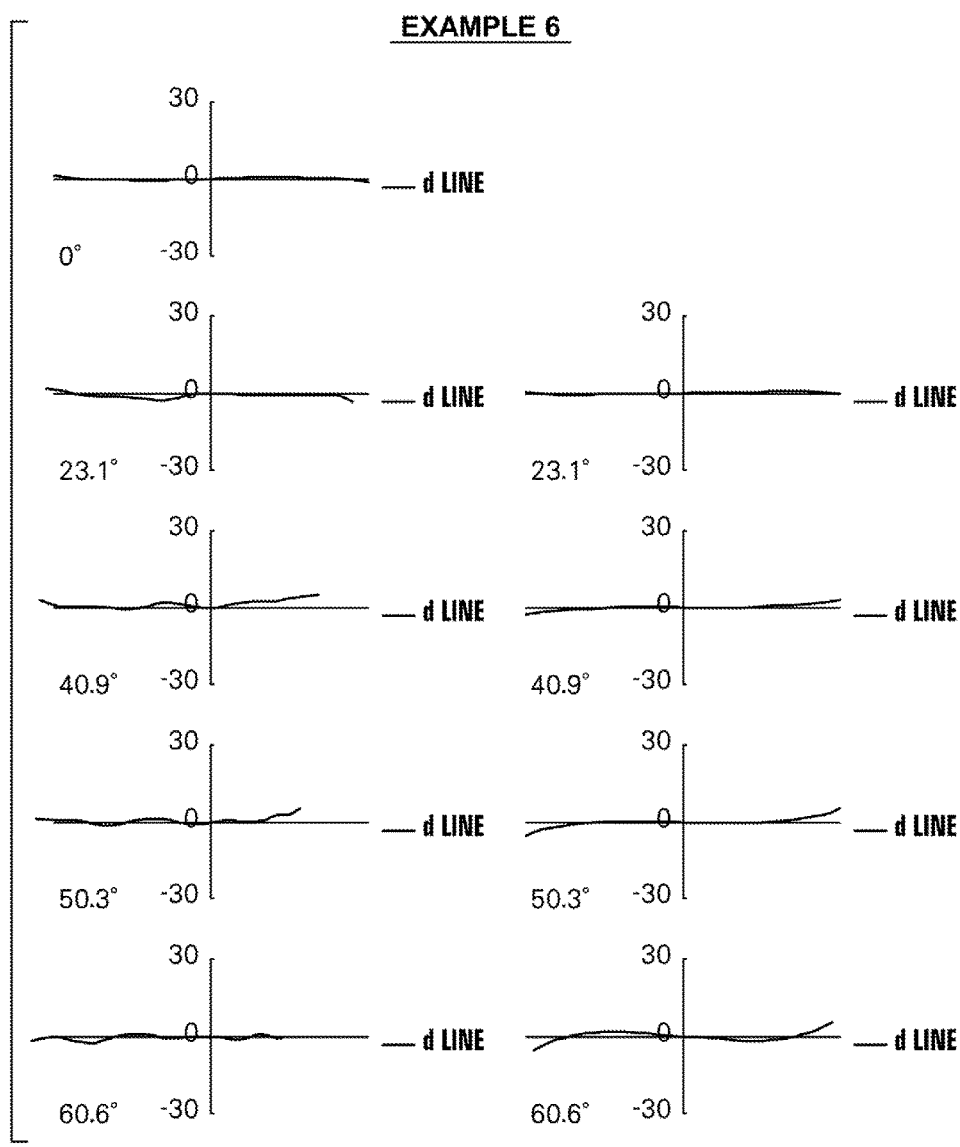
FIG. 22 is a collection of diagrams that illustrate transverse aberrations of the imaging lens of Example 6.

Next, an imaging lens of Example 6 will be described. FIG. 6 is a cross sectional diagram that illustrates the lens configuration of the imaging lens of Example 6. Basic lens data are shown in Table 16, data related to various items are shown in Table 17, and aspherical surface coefficients are shown in Table 18 for the imaging lens of Example 6. In addition, FIG. 14 is a collection of diagrams that illustrate various aberrations of the imaging lens of Example 6, and FIG. 22 is a collection of diagrams that illustrate transverse aberrations of the imaging lens of Example 6.

TABLE 16

Example 6: Lens Data

| Surface Number | Radius of Curvature | Distance | nd | vd | FCφ |
|---|---|---|---|---|---|
| 1 | 19.1872 | 1.0200 | 1.58913 | 61.13 | |
| 2 | 3.6460 | 1.9192 | | | |
| *3 | −12.4211 | 0.7500 | 1.53112 | 55.30 | |
| *4 | 12.9139 | 0.8800 | | | |
| 5 | −25.8772 | 3.5194 | 1.69680 | 55.53 | |
| 6 | −6.7127 | 1.3555 | | | |
| 7 (stop) | ∞ | 2.0770 | | | |
| *8 ▼ | 5.4236 | 1.2000 | 1.53112 | 55.30 | 4.00 |
| *9 | −5.5486 | 0.2000 | | | |
| 10 | −44.6668 | 2.0000 | 1.61800 | 63.33 | |
| 11 | −3.8586 | 0.1350 | | | |
| *12 | −3.8051 | 1.0249 | 1.63367 | 23.82 | |
| 13 | 26.9411 | 4.3139 | | | |

TABLE 17

Example 6: Items

| | |
|---|---|
| f' | 3.17 |
| Bf' | 4.31 |
| FNo. | 2.30 |
| 2ω (°) | 121.2 |

TABLE 18

| Example 6: Aspherical Surface Coefficients | | | |
|---|---|---|---|
| | Surface Number | | |
| | 3 | 4 | 8 |
| KA | 1.6272345E+00 | −4.9874885E+00 | 4.0287923E+00 |
| A3 | −4.7490950E−18 | 4.1044057E−17 | 5.1143821E−18 |

TABLE 18-continued

| Example 6: Aspherical Surface Coefficients | | | |
|---|---|---|---|
| A4 | 1.2163829E−02 | 7.7210429E−03 | 2.9152791E−03 |
| A5 | −1.6011260E−03 | 1.6502620E−02 | −4.6872939E−03 |
| A6 | 1.7905137E−03 | −9.2696127E−03 | −1.8909103E−03 |
| A7 | −2.5409935E−03 | −2.3931982E−03 | 3.9429397E−03 |
| A8 | 3.9567205E−04 | 2.3981602E−03 | 7.4943927E−04 |
| A9 | 4.4087366E−04 | 3.8239552E−04 | −2.1974492E−03 |
| A10 | −1.2685794E−04 | −4.4131973E−04 | 2.4518216E−04 |
| A11 | −3.4587268E−05 | −2.8972009E−05 | 4.1199271E−04 |
| A12 | 1.2942369E−05 | 4.4046522E−05 | −6.8818386E−05 |
| A13 | 1.3427746E−06 | 9.2111854E−07 | −3.3546308E−05 |
| A14 | −6.0124814E−07 | −2.1814439E−06 | 3.6525729E−06 |
| A15 | −2.0544789E−08 | −1.1383709E−08 | 1.1024458E−06 |
| A16 | 1.0697457E−08 | 4.3015792E−08 | 5.4730703E−08 |

| | Surface Number | |
|---|---|---|
| | 9 | 12 |
| KA | 3.4964399E−01 | 6.3954227E−01 |
| A3 | 2.1161255E−18 | 0.0000000E+00 |
| A4 | 1.2801563E−02 | −4.4264842E−03 |
| A5 | −1.6295193E−02 | 2.7865906E−03 |
| A6 | 7.4304502E−03 | 3.4698512E−04 |
| A7 | 4.9414240E−03 | −2.1286148E−03 |
| A8 | −4.1333223E−03 | 5.3457711E−04 |
| A9 | −6.5470413E−04 | 4.1845964E−04 |
| A10 | 9.6499792E−04 | −1.5559500E−04 |
| A11 | 4.3569995E−05 | −3.9683613E−05 |
| A12 | −1.1841192E−04 | 1.5662362E−05 |
| A13 | −1.2674655E−06 | 1.8699833E−06 |
| A14 | 7.3392693E−06 | −6.6093491E−07 |
| A15 | 6.6821550E−09 | −3.4278468E−08 |
| A16 | −1.8064244E−07 | 9.8164513E−09 |

Figure 15:
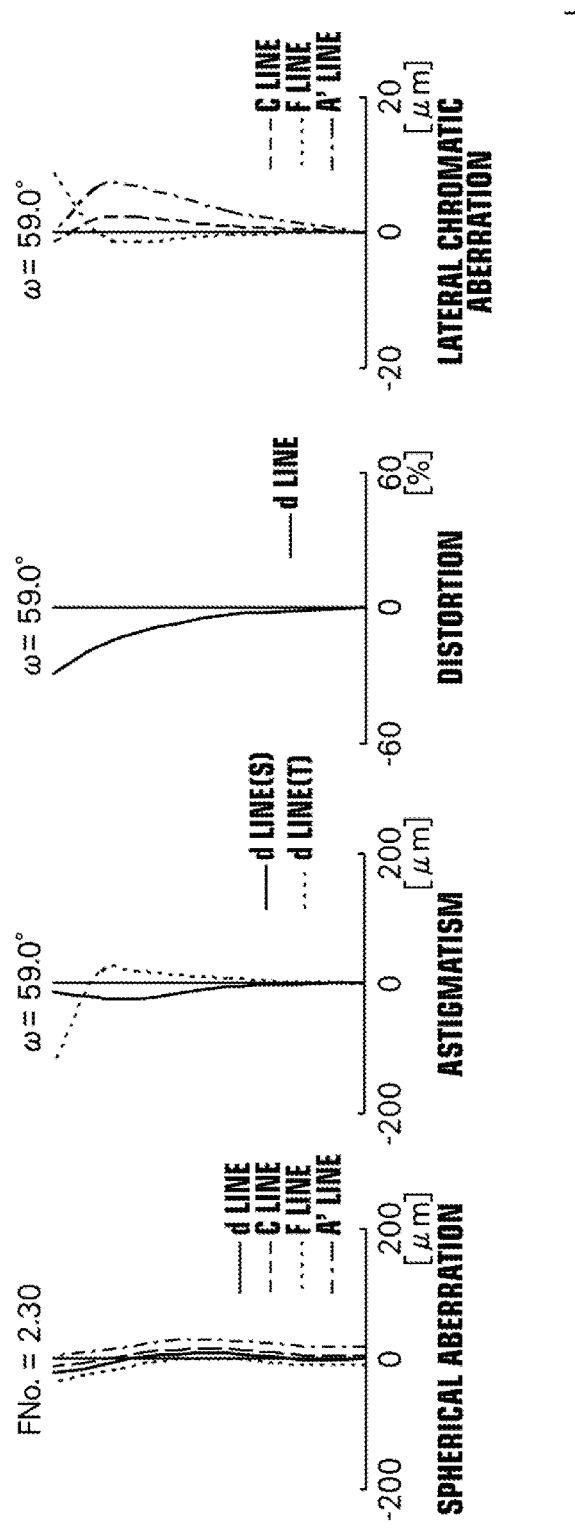
FIG. 15 is a collection of diagrams that illustrate aberrations of the imaging lens according to Example 7.
Figure 23:
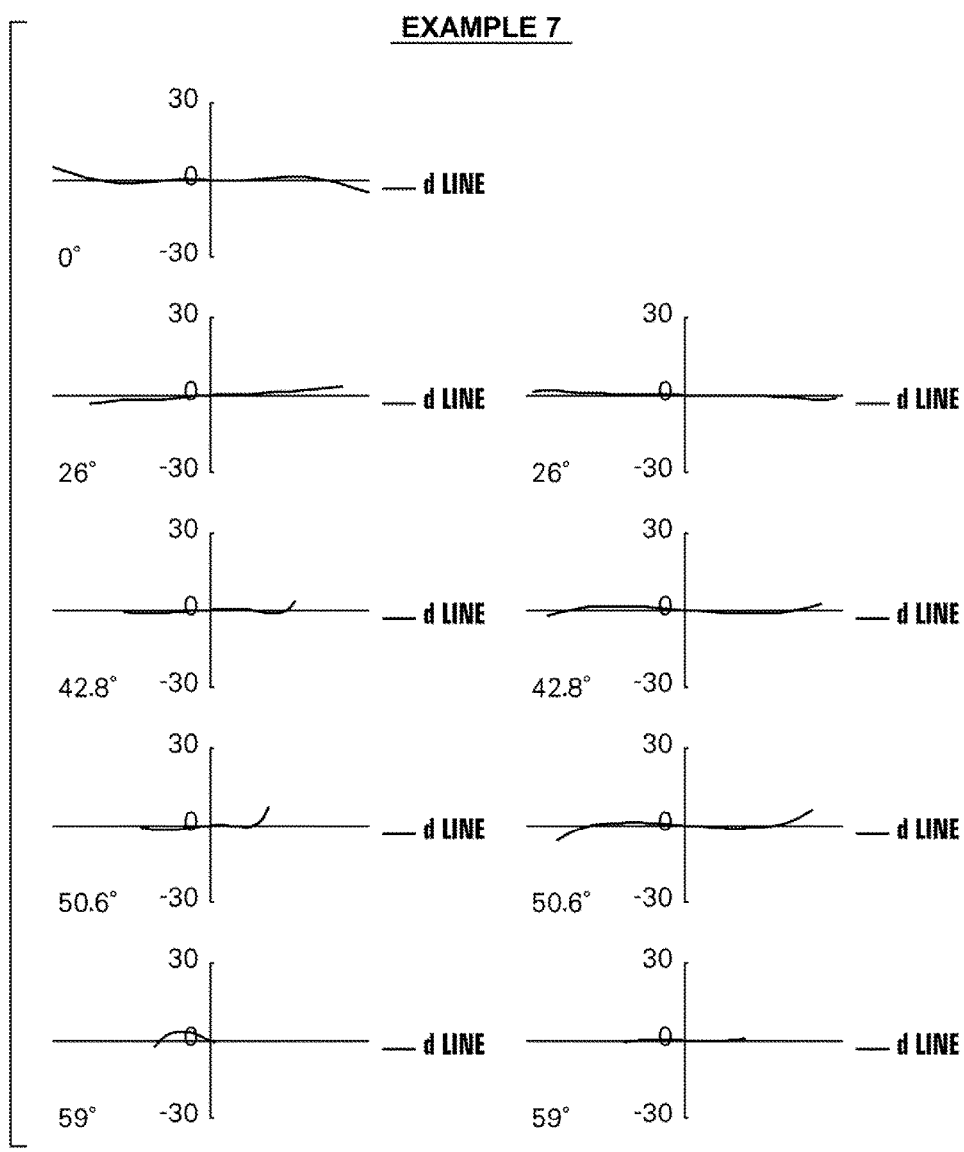
FIG. 23 is a collection of diagrams that illustrate transverse aberrations of the imaging lens of Example 7.

Next, an imaging lens of Example 7 will be described. FIG. 7 is a cross sectional diagram that illustrates the lens configuration of the imaging lens of Example 7. Basic lens data are shown in Table 19, data related to various items are shown in Table 20, and aspherical surface coefficients are shown in Table 21 for the imaging lens of Example 7. In addition, FIG. 15 is a collection of diagrams that illustrate various aberrations of the imaging lens of Example 7, and FIG. 23 is a collection of diagrams that illustrate transverse aberrations of the imaging lens of Example 7.

TABLE 19

Example 7: Lens Data

| Surface Number | Radius of Curvature | Distance | nd | vd | FCφ |
|---|---|---|---|---|---|
| 1 | 30.3049 | 1.0500 | 1.80400 | 46.58 | |
| 2 | 4.8745 | 1.5592 | | | |
| *3 | −4.4137 | 0.7500 | 1.53112 | 55.30 | |
| *4 | 27.8009 | 1.0614 | | | |
| 5 | 45.5021 | 2.2345 | 1.78590 | 44.20 | |
| 6 | −6.3546 | 2.7783 | | | |
| 7 ▼ | | 1.3000 | | | 2.45 |
| 8 (stop) | ∞ | 1.7000 | | | |
| *9 | −18.7438 | 1.4886 | 1.53112 | 55.30 | |
| *10 ▼ | −6.7755 | 0.3082 | | | 3.6 |
| *11 | 4.0481 | 2.3096 | 1.53112 | 55.30 | |

TABLE 19-continued

Example 7: Lens Data

| Surface Number | Radius of Curvature | Distance | nd | vd | FCφ |
|---|---|---|---|---|---|
| *12 | −2.9898 | 0.1304 | | | |
| 13 | −4.6639 | 1.0000 | 1.92286 | 18.90 | |
| 14 ▼ | −105.7753 | 3.6890 | | | 4.44 |

TABLE 20

Example 7: Items

| | |
|---|---|
| f | 2.70 |
| Bf | 3.69 |
| FNo. | 2.30 |
| 2ω (°) | 118.0 |

TABLE 21

Example 7: Aspherical Surface Coefficients

| | Surface Number | | |
|---|---|---|---|
| | 3 | 4 | 8 |
| KA | 8.8745325E−01 | 4.3053749E+00 | −7.0470830E−01 |
| A3 | 1.8441418E−17 | −6.7392441E−18 | 0.0000000E+00 |
| A4 | 5.3070615E−02 | 4.5898816E−02 | 8.5289542E−03 |
| A5 | −2.0202016E−02 | −1.2917396E−02 | −1.7729727E−02 |
| A6 | 1.0517463E−03 | −3.2503390E−04 | 1.4910272E−02 |
| A7 | 8.6661759E−04 | 4.8787329E−04 | −6.2888156E−03 |
| A8 | −1.7348241E−04 | −1.2425719E−04 | 2.9932739E−04 |
| A9 | −4.3414650E−07 | 2.4859021E−06 | 5.8196049E−04 |
| A10 | 1.8530471E−06 | 4.1682084E−06 | −1.8638463E−04 |

| | Surface Number | | |
|---|---|---|---|
| | 9 | 10 | 11 |
| KA | 4.9998915E+00 | 1.1064195E+00 | 1.0238200E+00 |
| A3 | 0.0000000E+00 | −1.1452697E−17 | 2.2903877E−17 |
| A4 | 1.5611259E−02 | 1.1476998E−02 | 2.0802488E−02 |
| A5 | −1.8834600E−02 | −1.5462068E−02 | −1.3216096E−02 |
| A6 | 6.5783854E−03 | 7.7480927E−03 | 1.1425100E−02 |
| A7 | 6.9293049E−04 | −8.6981738E−04 | −4.0415424E−03 |
| A8 | −8.1073893E−04 | −5.5735563E−04 | 1.6246313E−04 |
| A9 | −1.6091000E−05 | 2.1875765E−04 | 3.0790662E−04 |
| A10 | 2.9405091E−05 | −2.0158747E−05 | −5.1964433E−05 |

Figure 8:
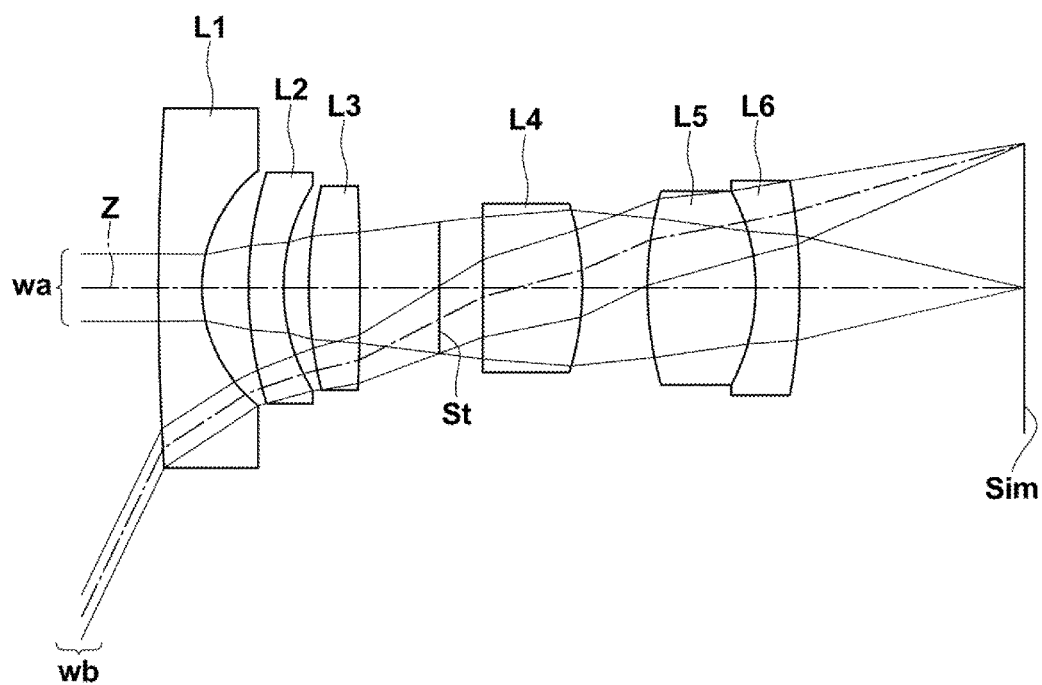
FIG. 8 is a cross sectional diagram that illustrates the lens configuration of an imaging lens according to Example 8 of the present disclosure.
Figure 16:
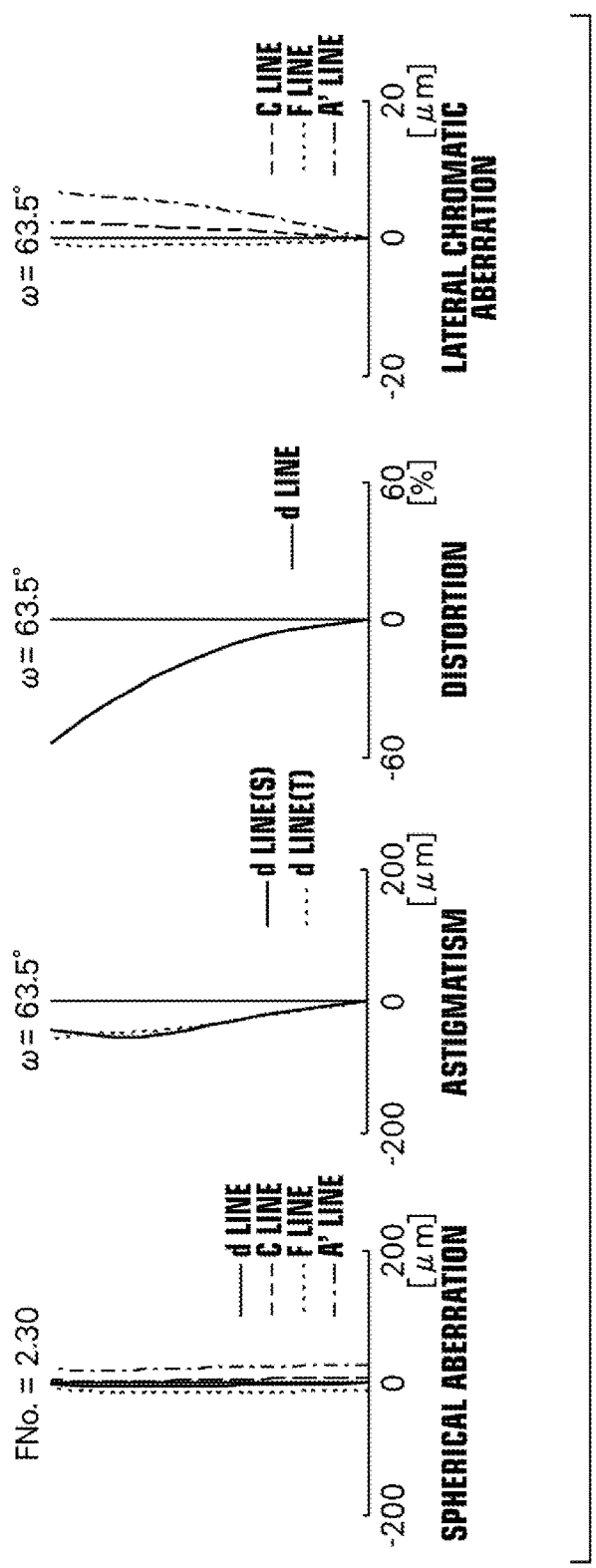
FIG. 16 is a collection of diagrams that illustrate aberrations of the imaging lens according to Example 8.
Figure 24:
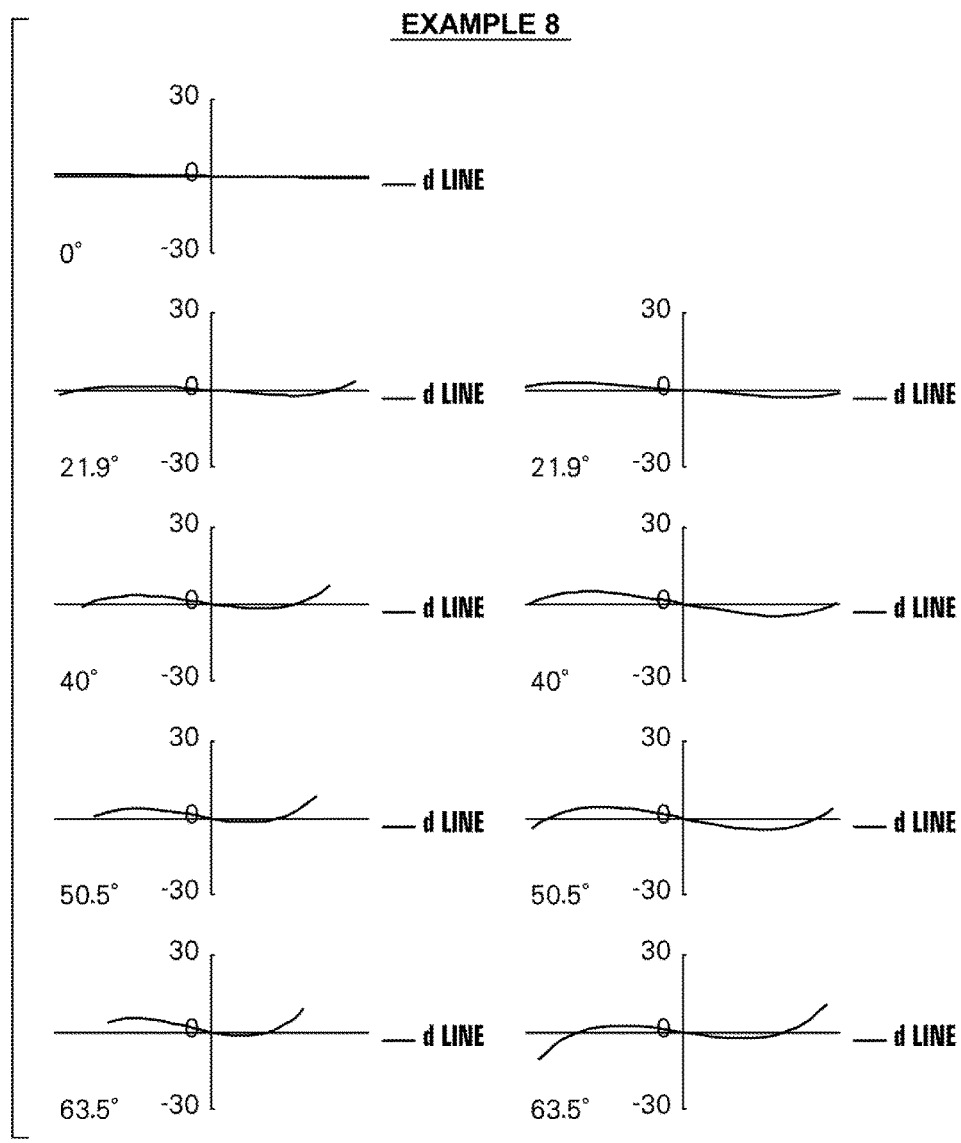
FIG. 24 is a collection of diagrams that illustrate transverse aberrations of the imaging lens of Example 8.

Next, an imaging lens of Example 8 will be described. FIG. 8 is a cross sectional diagram that illustrates the lens configuration of the imaging lens of Example 8. Basic lens data are shown in Table 22, and data related to various items are shown in Table 23 for the imaging lens of Example 7. In addition, FIG. 16 is a collection of diagrams that illustrate various aberrations of the imaging lens of Example 8, and FIG. 24 is a collection of diagrams that illustrate transverse aberrations of the imaging lens of Example 8.

TABLE 22

Example 8: Lens Data

| Surface Number | Radius of Curvature | Distance | nd | vd | FCφ |
|---|---|---|---|---|---|
| 1 | 60.5510 | 1.0000 | 1.80400 | 46.58 | |
| 2 | 3.2415 | 1.0806 | | | |
| 3 | 8.1024 | 0.8000 | 1.51633 | 64.14 | |
| 4 | 4.1808 | 0.5767 | | | |
| 5 | 8.8517 | 1.1726 | 1.83400 | 37.16 | |
| 6 | −51.6102 | 1.8086 | | | |
| 7 (stop) | ∞ | 1.0000 | | | |
| 8 | −174.1857 | 2.2930 | 1.75500 | 52.32 | |
| 9 | −5.9974 | 1.4880 | | | |
| 10 ▼ | 7.4624 | 2.4769 | 1.62041 | 60.29 | 3.95 |
| 11 | −4.3810 | 0.0000 | | | |
| 12 | −4.3811 | 1.0000 | 1.92286 | 18.90 | |
| 13 | −12.9492 | 5.1607 | | | |

TABLE 23

Example 8: Items

| | |
|---|---|
| f | 3.42 |
| Bf | 5.16 |
| FNo. | 2.30 |
| 2ω (°) | 127.0 |

Table 24 shows values related to Conditional Formulae (1) through (11) for the imaging lenses of Examples 1 through 8. Note that all of the Examples employ the d line as a reference wavelength, and the values shown in Table 24 below are those for the reference wavelength.

TABLE 24

| Formula | Condition | Example 1 | Example 2 | Example 3 | Example 4 | Example 5 | Example 6 | Example 7 | Example 8 |
|---|---|---|---|---|---|---|---|---|---|
| (1) | f1/f2 | 0.64 | 0.87 | 0.76 | 0.88 | 0.21 | 0.66 | 1.03 | 0.24 |
| (2) | f3/f | 3.22 | 3.10 | 2.18 | 3.28 | 2.52 | 3.81 | 2.68 | 2.68 |
| (3) | f12/f | −1.45 | −1.20 | −1.15 | −1.22 | −1.34 | −1.34 | −1.21 | −0.92 |
| (4) | f2/f | −4.06 | −2.95 | −3.03 | −2.95 | −8.21 | −3.72 | −2.63 | −5.26 |
| (5) | r6/f | −1.91 | −2.49 | −2.16 | −2.64 | −2.03 | −2.12 | −2.35 | −15.11 |
| (6) | f5/f | 1.63 | 1.32 | 1.23 | 1.36 | 1.19 | 2.11 | 1.35 | 1.42 |
| (7) | f6/f | −1.39 | −1.95 | −2.29 | −1.92 | −1.58 | −1.62 | −1.97 | −2.23 |
| (8) | L56/f | 0.043 | 0.050 | 0.045 | 0.050 | 0.045 | 0.043 | 0.048 | 0.000 |
| (9) | max \| f/fx \| | 0.72 | 0.76 | 0.81 | 0.73 | 0.84 | 0.62 | 0.74 | 0.80 |
| (10) | ν5 | 55.34 | 63.85 | 55.30 | 63.85 | 55.30 | 63.33 | 55.30 | 60.29 |
| (11) | ν6 | 23.82 | 18.90 | 18.90 | 18.90 | 18.90 | 23.82 | 18.90 | 18.90 |

As can be understood from the above data, the imaging lenses of Examples 1 through 8 satisfy Conditional Formulae (1) through (11), have wide angles of view with total angles of view of 100° or greater, and are high performance imaging lenses which are capable of high resolution imaging.

Figure 25:
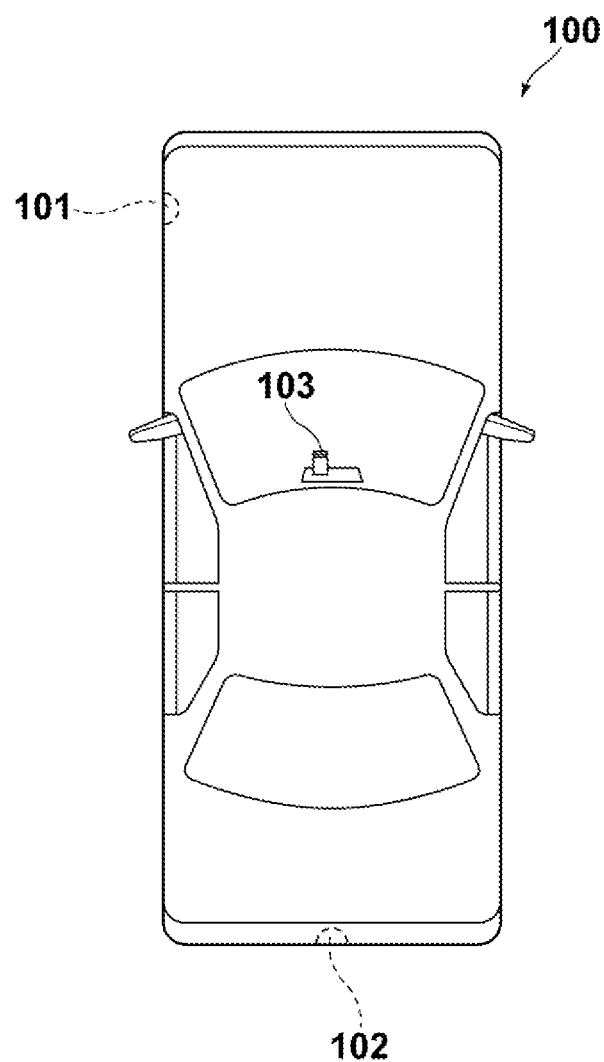
FIG. 25 is a diagram schematically illustrates the configuration of imaging apparatuses according to an embodiment of the present disclosure.

Next, an imaging apparatus according to an embodiment of the present disclosure will be described. Here, an example in which the embodiment of the imaging apparatus of the present disclosure is applied to vehicle mounted cameras will be described. FIG. 25 illustrates the manner in which vehicle mounted cameras are mounted on an automobile.

In FIG. 25, an automobile 100 is equipped with an externally mounted camera 101 for imaging a blind spot range at the side surface on the side of the passenger seat, an externally mounted camera 102 for imaging a blind spot range at the rear side of the automobile 100, and a internally mounted camera which is mounted on the back surface of the rear view mirror and images the same range as the field of view of a driver. The externally mounted camera 101, the externally mounted camera 102, and the internally mounted camera 103 are imaging apparatuses which are equipped with imaging lenses according to an embodiment of the present disclosure and imaging elements that convert optical images formed by the imaging lenses into electrical signals. The vehicle mounted cameras of the present embodiment (the externally mounted camera 101, the externally mounted camera 102, and the internally mounted camera 103) are equipped with imaging lenses according to the embodiment of the present disclosure. Therefore, the imaging apparatuses are capable of obtaining images having wide angles of view and high image quality.

The present disclosure has been described with reference to the embodiments and Examples. However, the present disclosure is not limited to the above embodiments and Examples, and various modifications are possible. For example, the values of the radii of curvature, the surface distances, the refractive indices, the Abbe's numbers, the aspherical surface coefficients, etc. of each of the lenses are not limited to those exemplified in the above Examples, and may be different values.

In addition, the imaging apparatus according to embodiments of the present disclosure are not limited to vehicle mounted cameras. The imaging apparatus of the present disclosure may be a camera for a portable terminal, a surveillance camera, a digital camera, etc.

What is claimed is:

1. An imaging lens consisting of, in order from the object side to the image side:
    a first lens having a negative refractive power and a concave surface toward the image side;
    a second lens having a negative refractive power;
    a third lens having a positive refractive power and a convex surface toward the image side;
    a fourth lens having a convex surface toward the image side;
    a fifth lens having a positive refractive power and a convex surface toward the image side; and
    a sixth lens having a negative refractive power and a concave surface toward the object side; and
    in which Conditional Formulae (1) and (2) below are satisfied:

$$0.15 < f1/f2 < 1.3 \tag{1}$$

$$1.8 < f3/f < 4.5 \tag{2}$$

wherein f1 is the focal length of the first lens, f2 is the focal length of the second lens, f3 is the focal length of the third lens, and f is the focal length of the entire lens system.

2. An imaging lens as defined in claim 1, wherein:
    the surface toward the image side of the second lens is concave.

3. An imaging lens as defined in claim 1, wherein:
    the surface toward the image side of the second lens is of a shape in which a line normal to the surface at an arbitrary point at 30% or greater of the image height of the surface intersects with the optical axis toward the image side of the surface.

4. An imaging lens as defined in claim 1, in which Conditional Formula (3) below is satisfied:

$$-1.9 < f12/f < -0.8 \tag{3}$$

wherein f12 is the combined focal length of the first lens and the second lens.

5. An imaging lens as defined in claim 1, in which Conditional Formula (4) below is satisfied:

$$-10 < f2/f < -2 \tag{4}$$

6. An imaging lens as defined in claim 1, in which Conditional Formula (5) below is satisfied:

$$-18 < r6/f < -1.7 \tag{5}$$

wherein r6 is the radius of curvature of the surface toward the image side of the third lens.

7. An imaging lens as defined in claim 1, in which Conditional Formula (6) below is satisfied:

$$0.9 < f5/f < 3 \tag{6}$$

wherein f5 is the focal length of the fifth lens.

8. An imaging lens as defined in claim 1, in which Conditional Formula (7) below is satisfied:

$$-3 < f6/f < -1 \tag{7}$$

wherein f6 is the focal length of the sixth lens.

9. An imaging lens as defined in claim 1, in which Conditional Formula (8) below is satisfied:

$$L56/f < 0.6 \tag{8}$$

wherein L56 is the distance along the optical axis between the fifth lens and the sixth lens.

10. An imaging lens as defined in claim 1, in which Conditional Formula (9) below is satisfied:

$$0.6 < \max|f/fx| < 0.85 \tag{9}$$

wherein fx is the focal length of an xth lens, and x is an integer from 1 to 6.

11. An imaging lens as defined in claim 1, wherein:
    the combined refractive power of the fourth lens and the fifth lens is positive; and
    stop is positioned between the third lens and the fourth lens.

12. An imaging lens as defined in claim 1, in which Conditional Formulae (10) and (11) below are satisfied:

$$55 < v5 \tag{10}$$

$$v6 < 30 \tag{11}$$

wherein v5 is the Abbe's number of the fifth lens, and v6 is the Abbe's number of the sixth lens.

13. An imaging lens as defined in claim 1, in which at least one of Conditional Formulae (1-1) and (2-1) below is satisfied:

$$0.15 < f1/f2 < 1.1 \quad (1\text{-}1)$$

$$2 < f3/f < 4 \quad (2\text{-}1).$$

14. An imaging lens as defined in claim 4, in which Conditional Formula (3-1) below is satisfied:

$$-1.6 < f12/f < -0.9 \quad (3\text{-}1).$$

15. An imaging lens as defined in claim 5, in which Conditional Formula (4-1) below is satisfied:

$$-8.5 < f2/f < -2.5 \quad (4\text{-}1).$$

16. An imaging lens as defined in claim 6, in which at least one of Conditional Formulae (5-1) and/or (5-2) below is satisfied:

$$-15.5 < r6/f < -1.9 \quad (5\text{-}1)$$

$$-3 < r6/f < -1.9 \quad (5\text{-}2).$$

17. An imaging lens as defined in claim 7, in which Conditional Formula (6-1) below is satisfied:

$$1.1 < f5/f < 2.5 \quad (6\text{-}1).$$

18. An imaging lens as defined in claim 8, in which Conditional Formula (7-1) below is satisfied:

$$-2.5 < f6/f < -1.2 \quad (7\text{-}1).$$

19. An imaging lens as defined in claim 12, in which at least one of Conditional Formulae (10-1) and/or (11-1) below is satisfied:

$$60 < v5 \quad (10\text{-}1)$$

$$v6 < 25 \quad (11\text{-}1).$$

20. An imaging apparatus equipped with an imaging lens as defined in claim 1.

* * * * *